US006922524B2

United States Patent
Sato

(10) Patent No.: US 6,922,524 B2
(45) Date of Patent: Jul. 26, 2005

(54) CAMERA HAVING BLUR DETECTING FUNCTION

(75) Inventor: Tatsuya Sato, Iruma (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/715,711

(22) Filed: Nov. 18, 2003

(65) Prior Publication Data

US 2004/0218914 A1 Nov. 4, 2004

(30) Foreign Application Priority Data

Nov. 27, 2002 (JP) .................................... 2002-344187
Nov. 27, 2002 (JP) .................................... 2002-344188
Nov. 27, 2002 (JP) .................................... 2002-344189
Nov. 27, 2002 (JP) .................................... 2002-344190

(51) Int. Cl.[7] .................. G03B 17/00; G03B 15/05; G03B 7/093
(52) U.S. Cl. .................. 396/52; 396/165; 396/169; 396/246
(58) Field of Search .................. 396/52–55, 165, 396/168, 169, 242, 246; 348/208.12, 208.15, 208.16, 362, 370, 371

(56) References Cited

U.S. PATENT DOCUMENTS 4,709,138 A * 11/1987 Suda et al. .............. 250/201.8
5,402,197 A * 3/1995 Okano et al. .................. 396/55
5,937,214 A * 8/1999 Shintani et al. ................ 396/55

FOREIGN PATENT DOCUMENTS

| JP | 5-150309 | 6/1993 |
| JP | 7-270844 | 10/1995 |
| JP | 2003-270692 | 9/2003 |
| JP | 2003-280059 | 10/2003 |

* cited by examiner

Primary Examiner—W. B. Perkey
(74) Attorney, Agent, or Firm—John C. Pokotylo; Straub & Pokotylo

(57) ABSTRACT

A camera having a blur notifying function according to one aspect of the present invention has a blur mode setting section which is used to set a blur notification mode in which a blur is detected in the camera and a blur state is notified, a blur detection section which detects a blur state of the camera, a blur calculation section which calculates a generated blur state quantity based on an output from the blur detection section, a blur judgment section which judges a blur state based on the generated blur state quantity, and a blur notification section which performs a notification operation concerning occurrence of a blur state based on a judgment result of the blur judgment section, the blur notification section starting the notification operation when the blur mode setting section sets the blur notification mode.

13 Claims, 16 Drawing Sheets

CAMERA HAVING BLUR DETECTING FUNCTION

CROSS-REFERENCE TO RELATED APPLICATIONS

This application is based upon and claims the benefit of priority from the prior Japanese Patent Applications No. 2002-344187, filed Nov. 27, 2002; No. 2002-344188, filed Nov. 27, 2002; No. 2002-344189, filed Nov. 27, 2002; and No. 2002-344190, filed Nov. 27, 2002, the entire contents of all of which are incorporated herein by reference.

BACKGROUND OF THE INVENTION

1. Field of the Invention

The present invention relates to a camera which detects a state of a blur such as a hands movement and notifies a user of this state or reduces an affect of the blur when the blur is generated.

2. Description of the Related Art

There has been heretofore proposed a camera which detects a state of a blur generated when, e.g., taking a picture by a camera, and performs a predetermined notification operation concerning occurrence of a blur state with respect to a user. In Jpn. Pat. Appln. KOKAI Publication No. 7-270844 discloses a camera having a blur correcting function which starts display of a blur state with a timing that a first release switch is turned on and stops display of the blur state with a timing that a second release switch is turned on.

On the other hand, there has been also proposed a camera which detects a state of a blur generated when, e.g., taking a picture by the camera and corrects the blur. Jpn. Pat. Appln. KOKAI Publication No. 5-150309 discloses a technique concerning a compact camera. This compact camera detects blur when a first release switch is turned on, and interrupts displaying a blur state in view of a fact that holding the camera is unstable due to a camera operation when a zoom SW or an exposure mode setting SW is operated during display of a blur state based on a detection result, and thereafter restarts display.

Further, Jpn. Pat. Appln. KOKAI Publication No. 2003-280059 discloses a technique characterized in that an exposure quantity (exposure time) is changed in accordance with a state of a blur generated after a second release switch is turned on and before start of exposure.

Furthermore, Jpn. Pat. Appln. KOKAI Publication No. 2003-270692 discloses a technique which sets a threshold value for blur notification so as to differ depending on an on state and an off state of a first release switch when notifying a blur state based on a largeness relationship between a blur detection value and the threshold value for notification, and reduces (rigidifies) the threshold value when the first release switch is in the on state so that a blur warning is frequently given as compared with a case that the first release switch is ON.

It is an object of the present invention to detect a blur state, display a notification, reduce an affect of the blur, improve the usability and assuredly support achievement of a shooting operation without increasing a cost.

BRIEF SUMMARY OF THE INVENTION

According to one aspect of the present invention, there is provided a camera having a blur notifying function comprising: a blur mode setting section which sets a blur notification mode in which a blur in the camera is detected and a blur state is notified; a blur detection section which detects the blur state of the camera; a blur calculation section which calculates a generated blur state quantity based on an output from the blur detection section; a blur judgment section which judges the blur state based on the generated blur state quantity; and a blur notification section which performs a notification operation concerning generation of the blur state based on a judgment result of the blur judgment section, wherein the blur notification section starts the notification operation when the blur notification mode is set by the blur mode setting section.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First to fourth embodiments according to the present invention will now be described hereinafter with reference to the accompanying drawings.

(First Embodiment)

Figure 1:
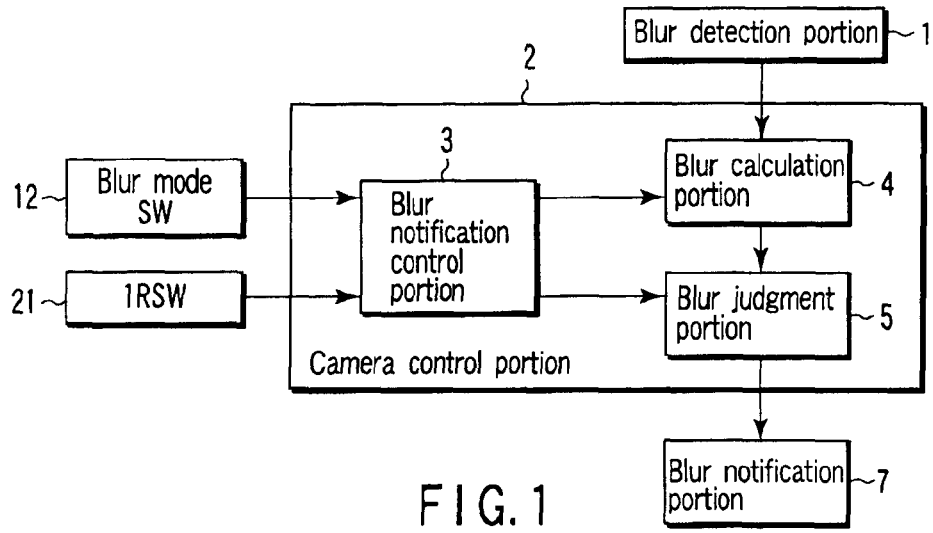
FIG. 1 is a view showing a structure of a camera having a blur notifying function according to a first embodiment of the present invention.

FIG. 1 shows a structure of a camera having a blur notifying function according to the first embodiment of the present invention, and this camera will be described hereunder.

As shown in FIG. 1, a camera control section 2 which is in charge of a control over the entire camera contains a blur notification control section 3, a blur calculation section 4 and a blur judgment section 5.

Respective outputs of a blur mode SW 12 and a first release switch (1RSW) 21 are electrically connected with inputs of the blur notification control section 3. An output of the blur notification control section 3 is electrically connected with inputs of the blur calculation section 4 and the blur judgment section 5.

An output of a blur detection section 1 is electrically connected with an input of the blur calculation section 4. An output of the blur calculation section 4 is electrically connected with the other input of the blur judgment section 5. An output of the blur judgment section 5 is electrically connected with an input of a blur notification section 7.

In such a structure, a user sets a blur notification mode in a blur mode SW 12 if this mode is desirable. This "blur notification mode" is a setting mode used to perform a notification operation in the blur notification section 7 when a blur is detected in the camera.

With the blur notification mode being set, for example, when a signal from the blur detection section 1 such as an AF sensor (including a signal concerning a blur state of the camera) is fetched into the blur calculation section 4, the blur calculation section 4 obtains a generated blur state quantity (e.g., an image blur quantity) based on this signal. A signal concerning this generated blur state quantity is supplied to the blur judgment section 5. Then, the blur judgment section 5 judges a blur based on the generated blur state quantity. In this example, the blur is judged by, e.g., comparing the generated blur state quantity with a predetermined threshold value.

The blur notification section 7 is constituted of an LED or the like provided in the vicinity of, e.g., a finder. The blur notification section 7 performs notification concerning occurrence of a blur state (which is also referred to as blur display) based on a signal concerning a result of the judgment by the blur judgment section 5.

It is to be noted that the blur notification section 7 is constituted in such a manner that a meaning of a notification content varies depending on presence/absence of lighting of an LED before and after an operation of the 1RSW 21 when the blur notification section 7 is formed by using an LED which is also utilized for other purposes.

Differences in the notification content when the LED provided in the vicinity of the finder is also used for a strobe, an AF and a blur will be described later in detail.

This first embodiment has one of characteristics in starting a notification operation by the blur notification section 7 under the control of the camera control section 2 when the blur notification mode is set by the blur mode SW 12.

Further, although the first embodiment further includes the 1RSW 21 used to instruct a shooting preparation operation as described above, it also has one of the characteristics in stopping a blur state notification operation by the blur notification section 7 in response to manipulating the 1RSW 21.

Figure 2A:
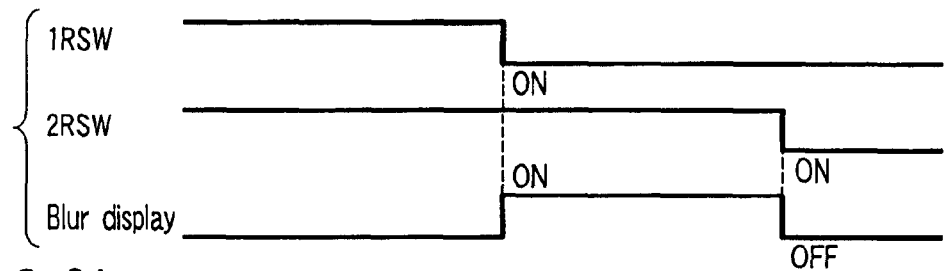
FIG. 2A is a timing chart illustrating a notification operation by a camera having a blur notifying function according to a prior art.

The above-described characteristics will now be described in more detail with reference to timing charts of FIGS. 2A and 2B. In the technique concerning Jpn. Pat. Appln. KOKAI Publication No. 7-270844 cited as the prior art, the control is effected in such a manner that the blur display is started when the 1RSW is turned on and the blur display is terminated when the 2RSW is turned on as shown in FIG. 2A.

Figure 2B:
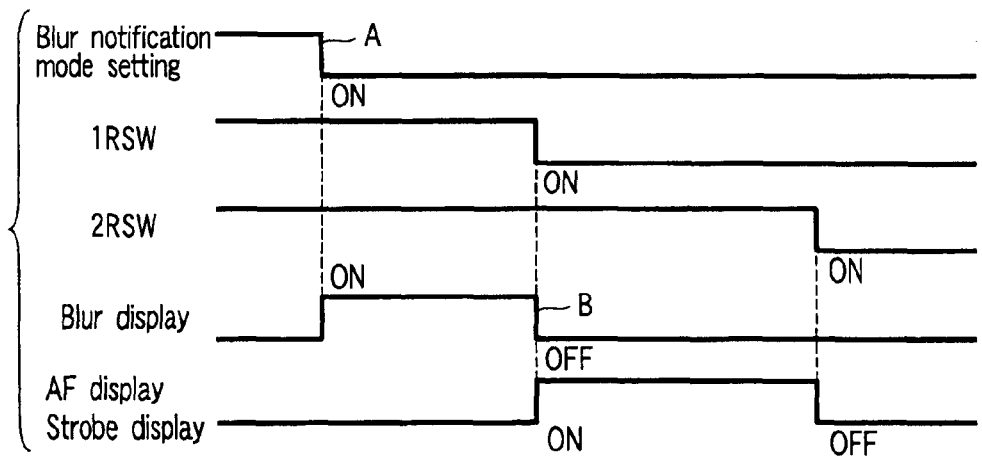
FIG. 2B is a timing chart illustrating characteristics of a notification operation of the camera having a blur notifying function according to the first embodiment of the present invention.

On the contrary, in the camera having a blur notifying function according to the first embodiment, as shown in, e.g., the timing chart of FIG. 2B, the notification operation by the blur notification section 7 is started when the blur notification mode is set (denoted by reference character A in the drawing) by the blur mode SW 12. Furthermore, the control is effected so as to terminate the notification operation by the blur notification section 7 when the 1RSW 21 is turned on (denoted by reference character B).

In the prior art, since it is often the case that a user as beginner fully pushes the release button in order to take a picture, there is a problem that it is too late to start the blur state display with a timing that the 1RSW is turned on.

In this regard, the first embodiment eliminates such a problem, and it can enhance the effect of attracting a camera user's attention by performing the blur display in the early stage that the blur notification mode is set.

The first embodiment will now be described in more detail hereinafter with reference to FIGS. 3 to 16, but the following content is also common to second to fourth embodiments.

Figure 3:
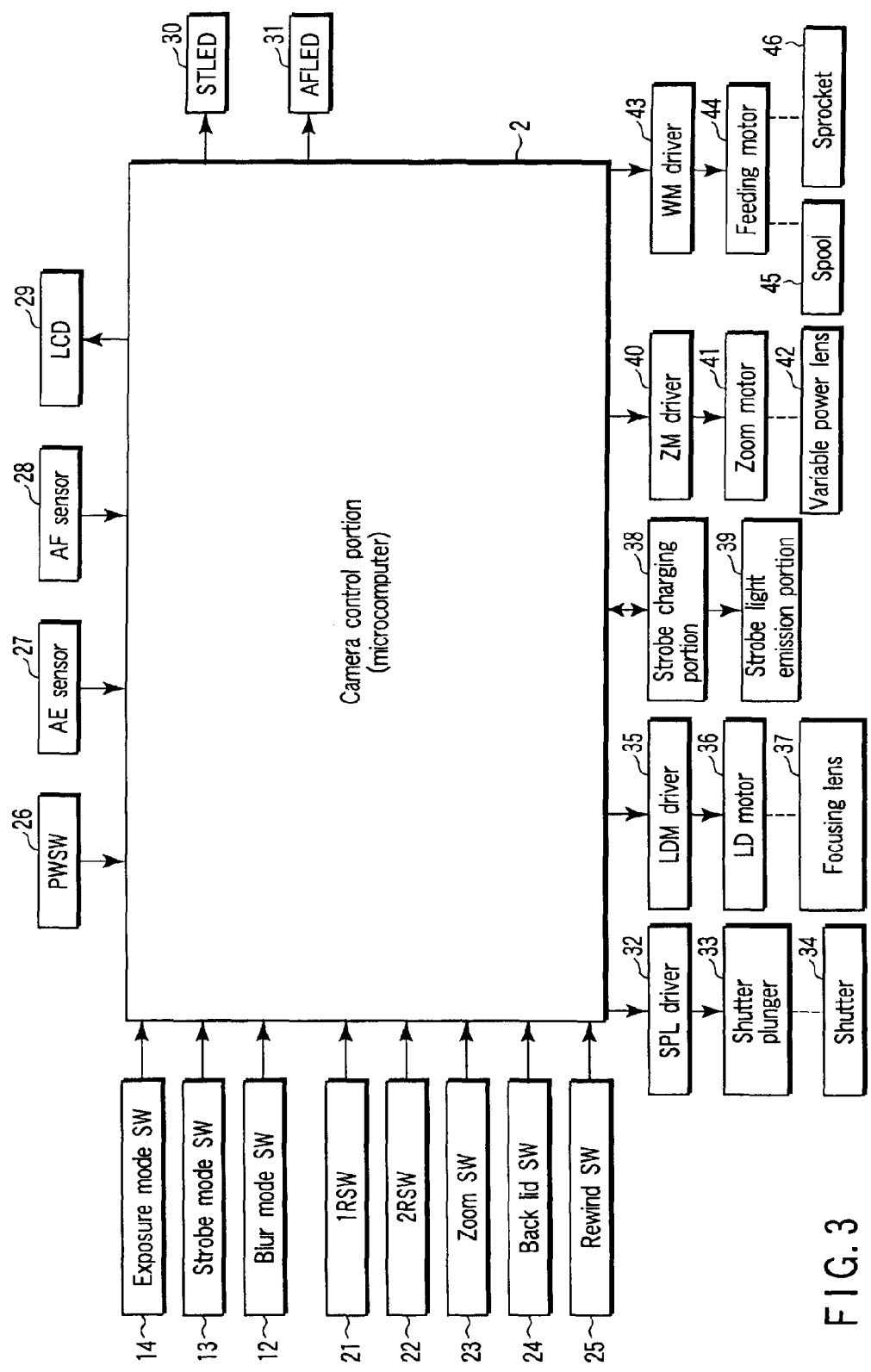
FIG. 3 is a view showing an embodied structure of the camera having a blur notifying function according to the first embodiment of the present invention.

FIG. 3 shows an embodied camera having a blur function according to the first embodiment of the present invention, and its structure and effects will be described in detail.

As shown in FIG. 3, to a camera control section 2 are electrically connected a blur mode SW 12, a strobe mode SW 13, an exposure mode SW 14, a 1RSW 21, a 2RSW 22, a zoom SW 23, a back lid SW 24, a rewind SW 25, a power (PW) SW 26, an AE sensor 27 and an AF sensor 28, an LCD 29 for various types of display, a strobe (ST) LED 30, and an AFLED 31.

That is, the above-described various kinds of operation members, various kinds of detection members, and various kinds of display members are electrically connected with the camera control section 2.

In more detail, the blur mode SW 12 is a switch used to set a blur notification mode based on an operation by a user.

The strobe mode SW 13 is a switch used to set a strobe mode in order to emit the light from a strobe light emission section 39 under predetermined conditions. The exposure mode SW 14 is a switch used to set, e.g., an AUTO mode, a night scene mode (mode to finely take a picture of a person in a night scene) and others. The zoom SW 23 is a switch used to instruct to, e.g., drive a variable power lens 42 to a wide-angle side or a telescopic side as desired.

The back lid SW 24 is a switch which is turned on with a timing to change a back lid (reference numeral 57 in FIG. 5) from an opened state to a closed state. The rewind SW 25 is a switch to instruct forcible rewinding of a film. The PWSW 26 is a switch used to turn on/off a power supply of the camera.

On the other hand, an output of the camera control section 2 is electrically connected with a shutter plunger (SPL) driver 32 which controls a shutter 34 to be driven through a shutter plunger 33. Furthermore, an output of the camera control section 2 is electrically connected with an LD motor (LDM) driver 35 which controls a focusing lens 37 to be driven through an LD motor 36. Moreover, an output of the camera control section 2 is electrically connected with a strobe charging section 38 which performs charging for strobe light emission of the strobe light emission section 39.

Additionally, an output of the camera control section 2 is electrically connected with a zoom motor (ZM) driver 40 which controls the variable power lens 42 to be driven through a zoom motor 41. Further, an output of the camera control section 2 is electrically connected with a wind motor (WM) driver 43 which controls a spool 45 and a sprocket 46 to be driven through a feeding motor 44.

Characteristics effects based on such a structure will now be described hereinafter.

When the blur mode SW 12 is operated by a user and the blur notification mode is set, the camera control section 2 starts the notification operation of a blur.

That is, the camera control section 2 fetches an output signal from the AF sensor 28 corresponding to an example of the blur detection section 1 in FIG. 1. Then, it obtains a generated blur state quantity (e.g., an image blur quantity) based on this output signal, and judges a blur based on the generated image blur quantity. Further, if it is determined that the blur is generated, occurrence of the blur is notified (which is also referred to as blur display) by, e.g., alternately lighting an STLED 30 and an AFLED 31 corresponding to examples of the blur notification section 7 in FIG. 1.

Figure 4:
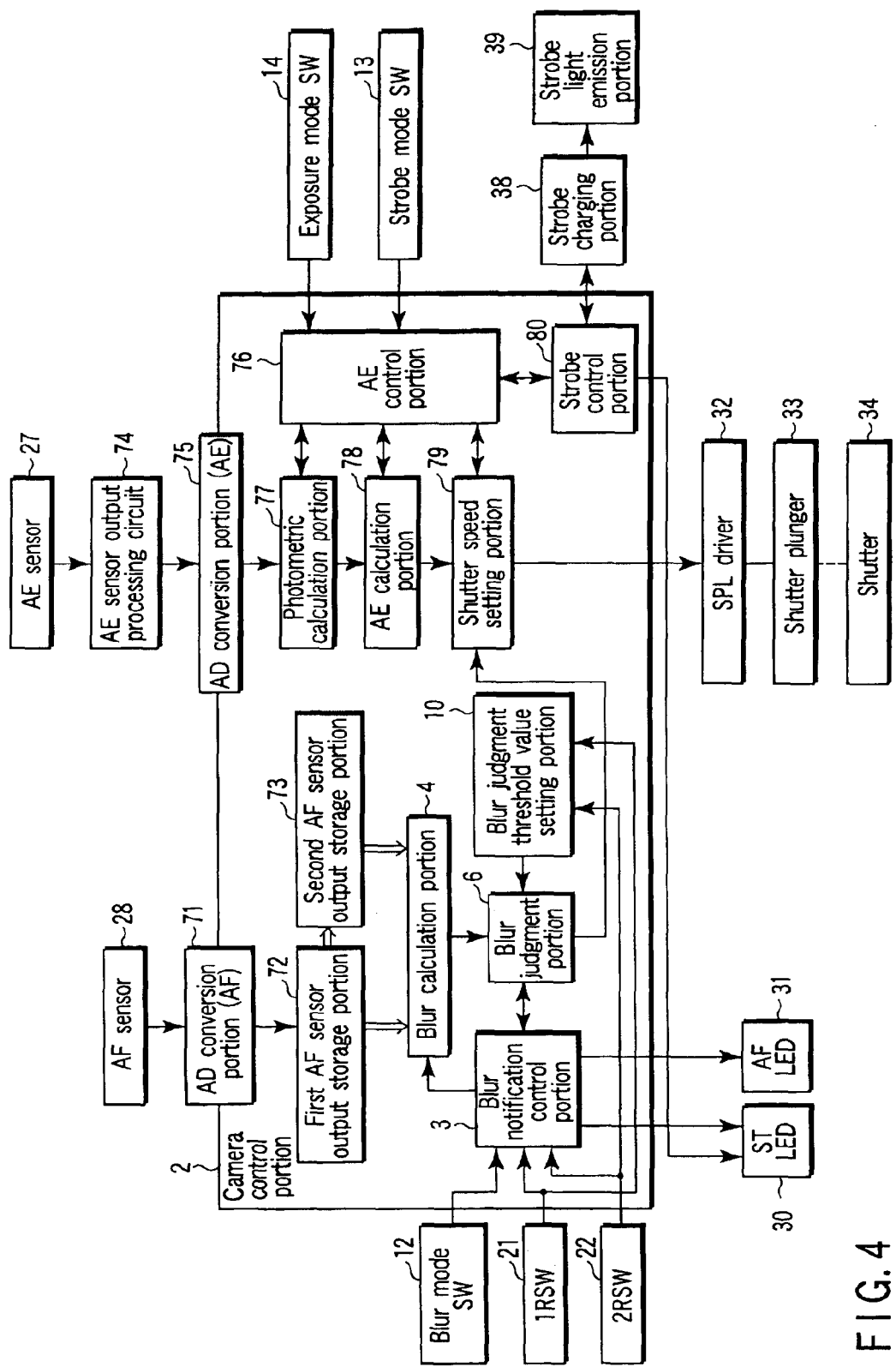
FIG. 4 is a view showing an internal structure of a camera control section 2 in more detail.

FIG. 4 illustrates an internal structure of the camera control section 2 in more detail.

Like reference numerals denote constituent elements equal to those in FIGS. 1 and 2.

As shown in FIG. 4, outputs of the blur mode SW 12, the 1RSW 21 and the 2RSW 22 are electrically connected with inputs of the blur notification control section 3, and outputs of the blur notification control section 3 are electrically connected with inputs of the blur calculation section 4 and the blur judgment section 6.

The outputs of the 1RSW 21 and the 2RSW 22 are also electrically connected with inputs of a blur judgment threshold value setting section 10, and an output of the blur judgment threshold value setting section 10 is electrically connected with the other input of the blur judgment section 6. The outputs of the blur notification control section 3 are also electrically connected with inputs of the STLED 30 and the AFLED 31.

On the other hand, an output of the AF sensor 28 is connected with an input of a first AF sensor output storage section 72 through an AD conversion section 71, and outputs of the first AF sensor output storage section 72 are electrically connected with inputs of a second AF sensor output storage section 73 and the blur calculation section 4. An output of the second AF sensor output storage section 73 is electrically connected with the other input of the blur calculation section 4, and an output of the blur judgment section 6 is electrically connected with an input of a shutter speed setting section 79.

Furthermore, an output of an AE sensor 27 is electrically connected with an input of an AE sensor output processing circuit 74. An output of the AE sensor output processing circuit 74 is electrically connected with an input of an AD conversion section 75. An output of the AD conversion section 75 is electrically connected with an input of a photometric calculation section 77. An output of the photometric calculation section 77 is electrically connected with an input of an AE calculation section 78. Moreover, an output of the AE calculation section 78 is electrically connected with an input of the shutter speed setting section 79.

An output of the shutter speed setting section 79 is electrically connected with an input of an SPL driver 32 which controls a shutter 34 to be driven through a shutter plunger 33. Besides, outputs of a strobe mode SW 13 and an exposure mode SW 14 are electrically connected with inputs of an AE control section 76, and the AE control section 76 is electrically connected with the photometric calculation section 77, the AE calculation section 78, the shutter speed setting section 79 and a strobe control section 80 which controls a strobe charging section 38 which charges a voltage used to emit the light from a strobe light emission section 39.

A description will now be given as to only characteristic effects based on such a structure.

When the blur mode SW 12 is operated by a user and the blur notification mode is set, the blur notification control section 3 starts the blur notification operation.

That is, a signal outputted from the AF sensor 28 is converted into a digital signal in the AD conversion section 71, and stored in the first AF sensor output storage section 72. This digital signal is supplied to the second AF sensor output storage section 73 from the first AF sensor output storage section 72, and stored in the second AF sensor output storage section 73.

Moreover, after an elapse of a predetermined time, a signal again outputted from the AF sensor 28 is converted into a digital signal by the AD conversion section 71, and then stored in the first AF sensor output storage section 72. The blur calculation section 4 calculates an image displacement quantity on the AF sensor 28 involved by occurrence of a hands movement of a camera operator based on the two outputs from the AF sensor 28 with a time interval stored in the first AF sensor output storage section 72 and the second AF sensor output storage section 73. A signal concerning the image displacement is supplied to the blur judgment section 6.

The blur judgment section 6 judges presence/absence of a blur by comparing the image displacement quantity with a threshold value stored in the blur judgment threshold value setting section 10. A signal concerning this judgment result is supplied to the blur notification control section 3 by the blur judgment section 6. Then, the blur notification control section 3 performs the blur display by alternately lighting the STLED 30 and the AFLED 31 based on the judgment result.

On the other hand, an output signal from the AE sensor 27 is supplied to the AE sensor output processing circuit 74 and subjected to output amplification. Thereafter, it is converted into a digital signal in the AD conversion section 75. Then, the photometric calculation section 77 performs a photometric calculation based on the digital signal. A result of this photometric calculation is supplied to the AE calculation section 78 where a predetermined AE calculation is carried out.

Moreover, upon receiving a signal concerning the blur judgment result from the blur judgment section 6, the shutter speed setting section 79 reduces shooting shutter speed if the current state is immediately before exposure with the blur notification mode being set and controls so as to decrease a blur quantity generated on a picture (film) based on hands movement when taking a picture. Specifically, a time to energize the SPL driver 32 is controlled.

At this moment, in a situation that the strobe light emission section 39 emits the light, the shutter speed is not changed even if the signal concerning the blur judgment result is outputted from the blur judgment section 6. This takes notice of a fact that a certain degree of an image blur cannot be a problem because the blur on a picture looks as if it is stopped due to emission of the flash light of the strobe when the strobe light emission section 39 is caused to emit the light.

It is to be noted that the blur state notification operation is temporarily stopped and the blur state notification operation is restarted after end of a predetermined operation of the camera when the predetermined operation is requested by, e.g., manipulating various kinds of switches during the blur state notification operation before the 1RSW 21 is turned on.

Figure 5A:
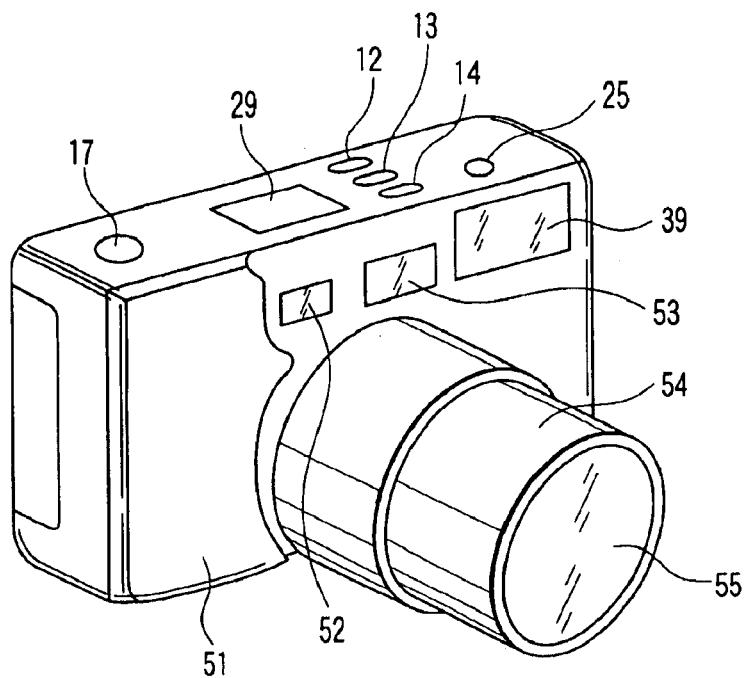
FIG. 5A is a perspective view showing the camera having a blur notifying function according to the first embodiment of the present invention from a front side.
Figure 5B:
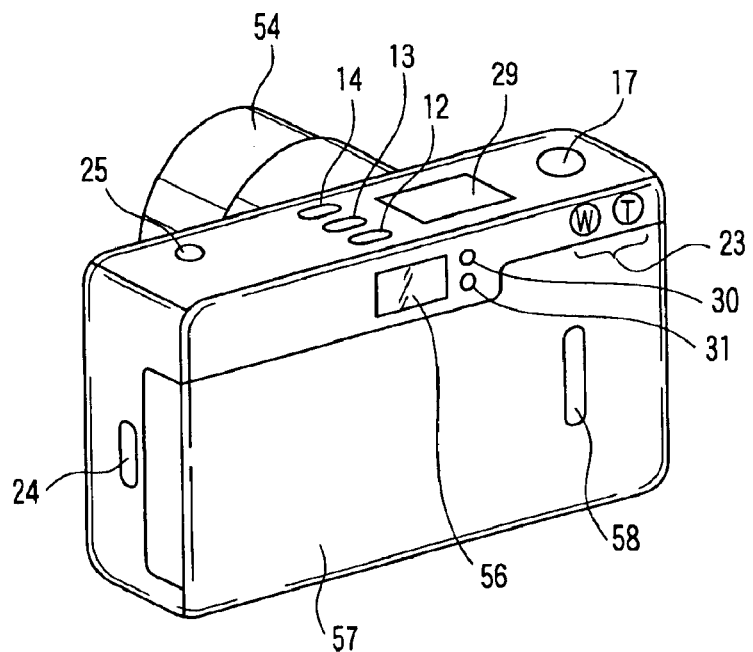
FIG. 5B is a perspective view showing the camera having a blur notifying function according to the first embodiment of the present invention from a rear side.

FIGS. 5A and 5B show an external structure example of the camera having a blur notifying function according to the first embodiment, and this structure will be described in detail.

FIG. 5A is a perspective view showing this camera from a front side, and FIG. 5B is a perspective view showing this camera from a rear side.

As shown in FIGS. 5A and 5B, on a top face of the camera are arranged a release SW 17, a display LCD 29, a blur mode SW 12 used to set the blur notification mode, a strobe mode SW 13 used to set the strobe mode, an exposure mode SW 14 used to set the exposure mode, and a rewind SW 25 used to forcibly rewind a film. The release SW 17 has a two-stage structure that the 1RSW 21 is turned on when the release SW 17 is half pushed and the 2RSW 22 is turned on when the same is fully pushed.

On a front surface of the camera are arranged at least a lens barrier 51 capable of being opened/closed without restraint (FIG. 5A shows an opened state), a finder window 52, an AE/AF sensor light receiving section 53, a barrel 54, a taking lens 55, and a strobe light emission section 39. The taking lens 55 and the barrel 54 can be retracted in the camera without restraint.

On a rear surface of the camera are arranged at least a zoom SW 23, an STLED 30, an AFLED 31, a finder 56, a back lid 57, and a Patrone window 58. A back lid SW 24 or the like is also arranged on a side surface of the camera.

Figure 6:
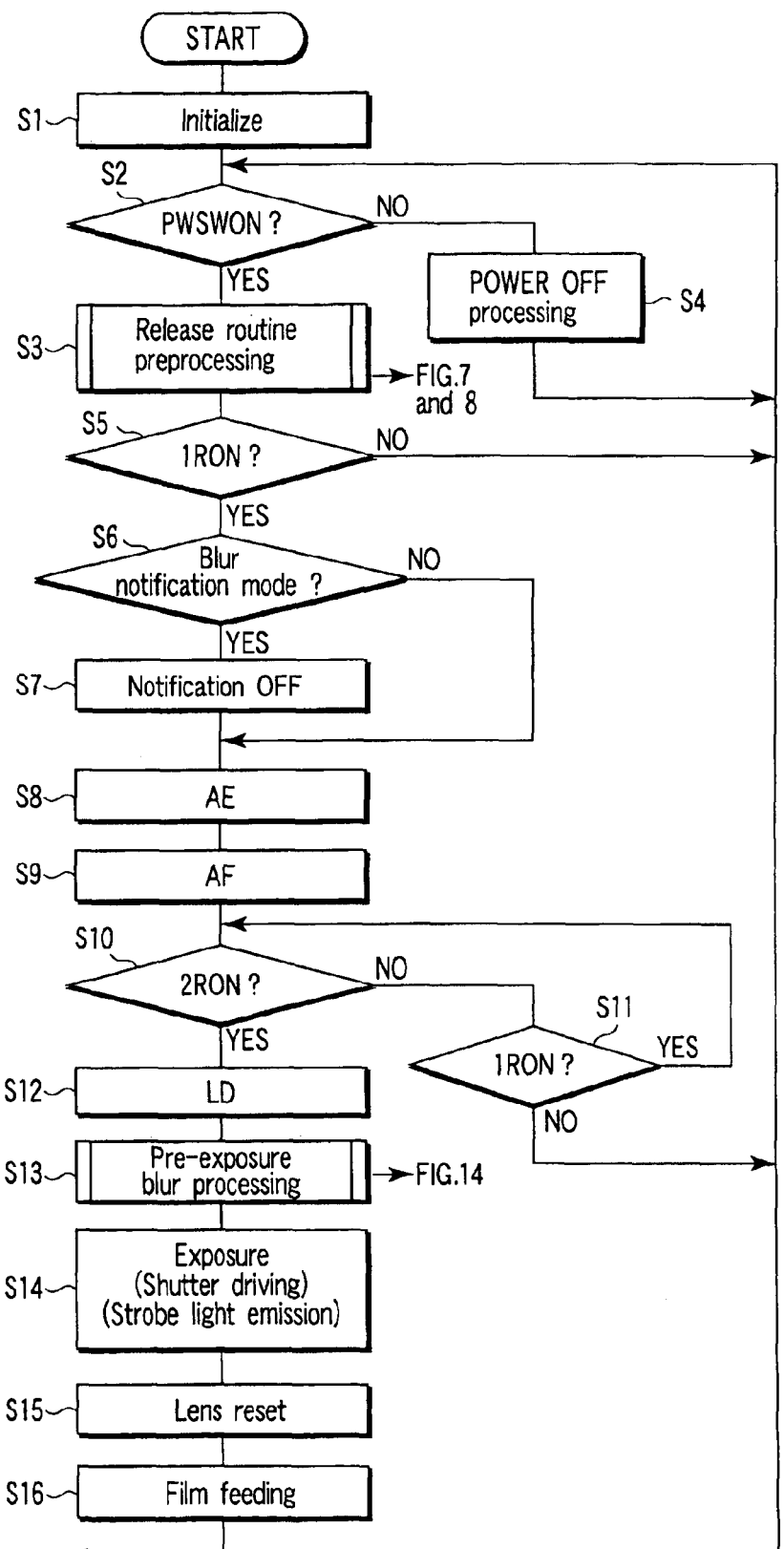
FIG. 6 is a flowchart illustrating an operation of the camera having a blur notifying function according to the first embodiment of the present invention in more detail.

An operation of the camera having a blur notifying function according to the first embodiment of the present invention will now be described in detail with reference to a flowchart of FIG. 6.

When an operation is started, a wide variety of variables are first initialized (step S1). Then, the camera control section 2 judges whether the PWSW 26 has been turned on (step S2). If the PWSW 26 has not been turned on, the camera control section 2 executes predetermined power off processing (step S4) and returns to the step S2.

Figure 7:
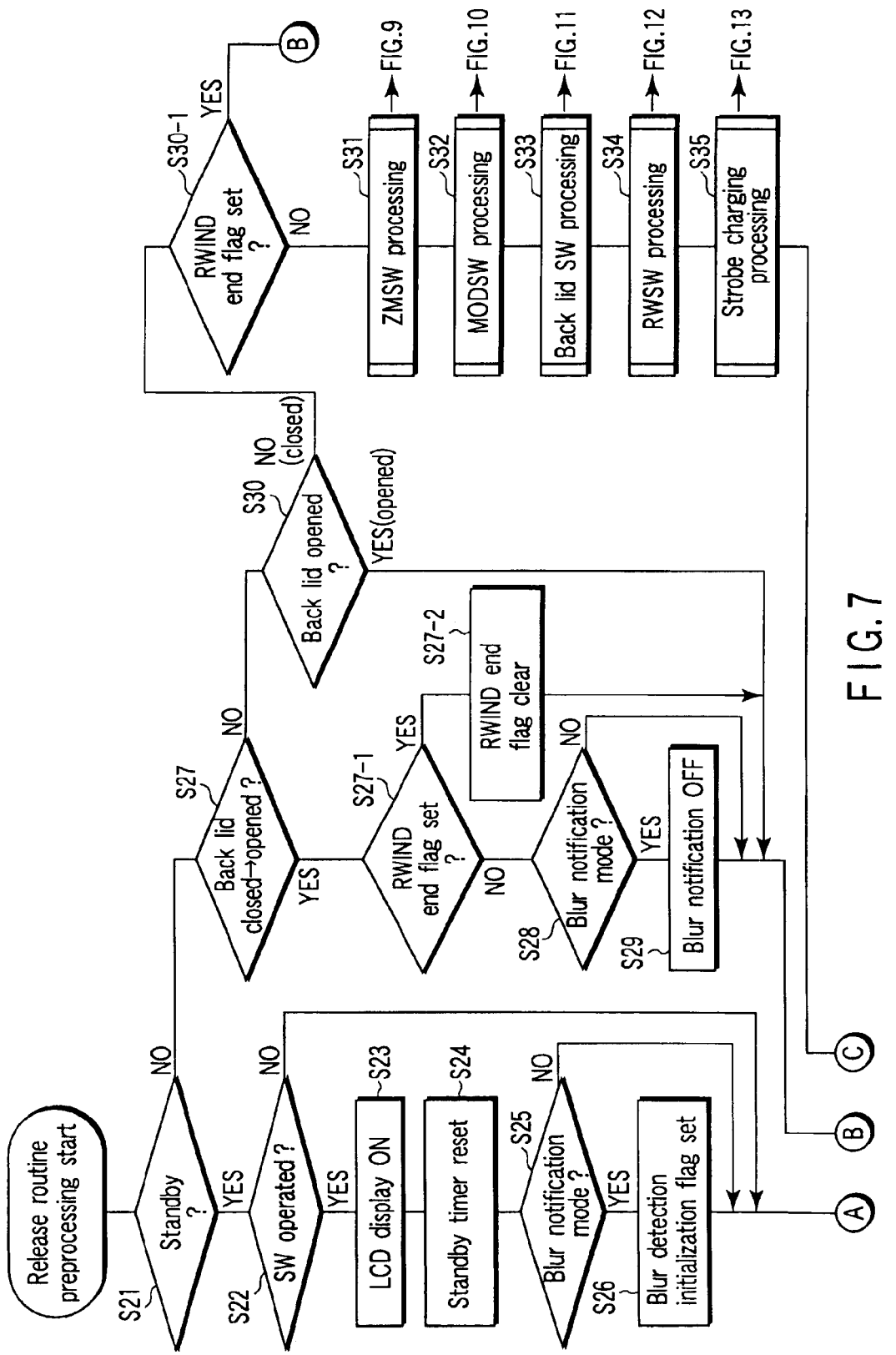
FIG. 7 is a flowchart illustrating an operation of a subroutine "release routine preprocessing" in more detail.
Figure 8:
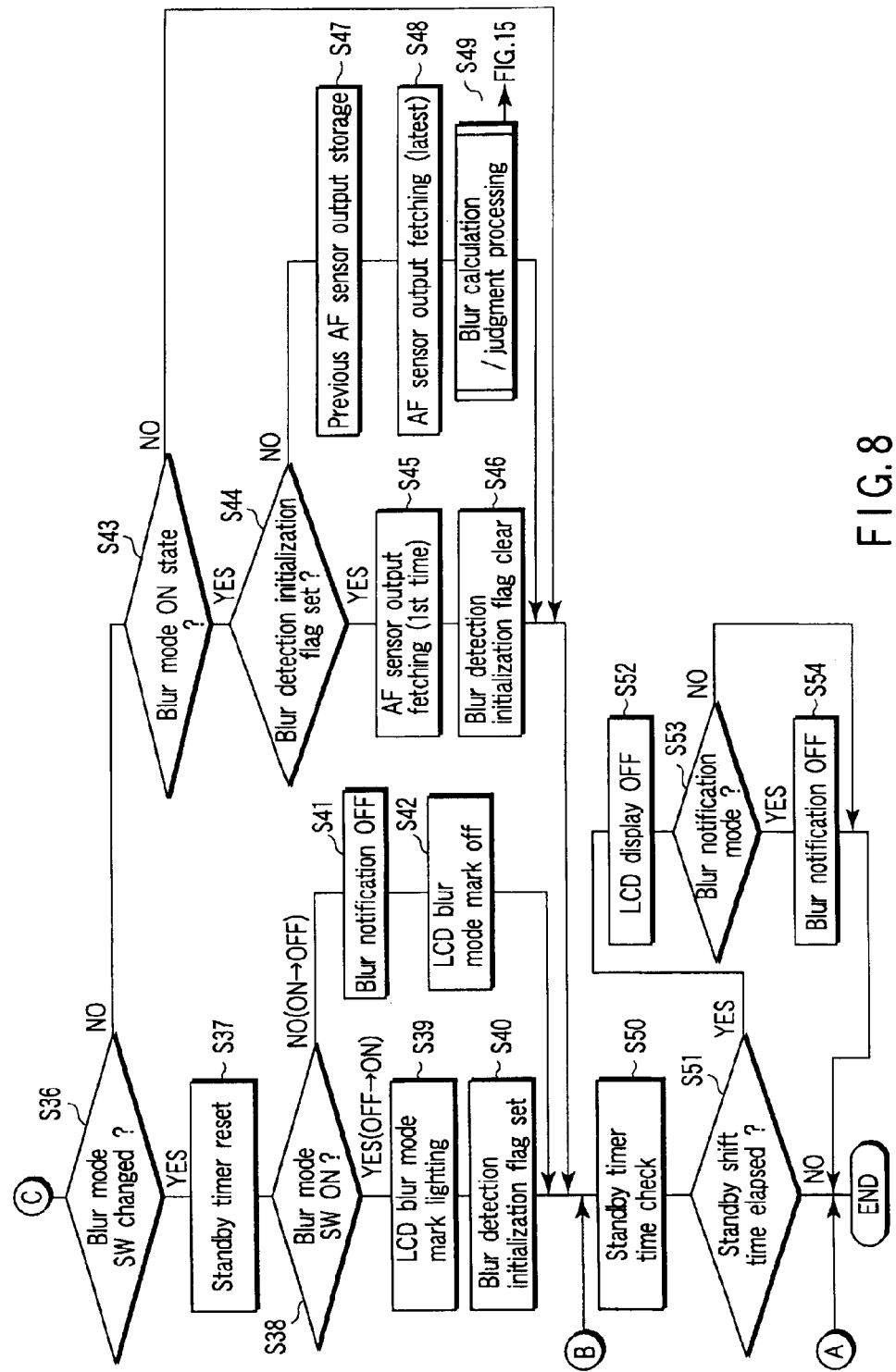
FIG. 8 is a flowchart illustrating the operation of the subroutine "release routine preprocessing" in more detail.

On the other hand, if the PWSW 26 has been turned on at the step S2, a subroutine "release routine processing" which will be described later in detail with reference to FIGS. 7 and 8 is executed (step S3). Then, the camera control section 2 judges whether the 1RSW 21 has been turned on (step S5). If it is determined that the 1RSW 21 has not been turned on, the processing returns to the step S2 and the above-described operation is repeated.

If the camera control section 2 determines that the 1RSW 21 has been turned on at this step S5, a judgment is made upon whether the blur notification mode is set (step S6). If it is determined that the blur notification mode is not set, the processing advances to a step S8. If it is determined that the blur notification mode is set, display by the STLED 30 and the AFLED 31 is temporarily turned off (step S7), and the processing proceeds to the step S8.

Subsequently, under the control of the camera control section 2, a predetermined AE operation (step S8) and a predetermined AF operation (step S9) are executed, and a judgment is made upon whether the 2RSW 22 has been turned on (step S10). Here, if it is determined that the 2RSW 22 has not been turned on, a judgment is made upon whether the 1RSW 21 has been turned on (step S11). If it is determined that the 1RSW 21 has been turned on, the processing returns to the step S10 and the above-described operation is repeated. If it is determined that the 1RSW 21 has not been turned on, the processing returns to the step S2 and the above-described operation is repeated. Additionally, if it is determined that the 2RSW 22 has been turned on at the step S10, the camera control section 2 drives (LD) the focusing lens 37 (step S12) and executes a subroutine "pre-exposure blur processing" which will be described later in detail with reference to FIG. 14 (step S13).

Subsequently, under the control of the camera control section 2, exposure (including shutter driving and strobe light emission) is performed (step S14), the focusing lens is returned to an initial position (lens reset) (step S15), a film is fed (step S16), and the processing returns to the step S2, thereby advancing to a next picture taking operation.

An operation of a subroutine "release routine pre-processing which is executed at the step S3 will now be described in detail with reference to flowcharts of FIGS. 7 and 8.

This subroutine mainly starts the blur notification operation when the blur notification mode is set, temporarily stops notification of a blur when another instruction is inputted during the blur notification operation, and restarts the blur notification operation upon end of an operation concerning the instruction.

When this subroutine is started, a judgment is first made upon whether the current mode is a standby mode (step S21). Here, the standby mode means, e.g., an "energy saving mode" which is set when no operation instruction is issued even if a predetermined time elapses after turning on the power supply.

If it is determined that the current state is in the standby mode at the step S21, a judgment is made upon whether operations of various kinds of SW have been performed (step S22). The various kinds of SW means, e.g., the strobe mode SW 13, the exposure mode SW 14, the zoom SW 23, the back lid SW 24 and the rewind SW 25. If it is determined that the various kinds of SW have not been operated at the step S22, this subroutine is terminated.

On the other hand, if it is determined that any SW has been operated, display of the LCD 29 is turned on (step S23), counting of a standby timer (timer to clock a time until the state is shifted to the energy saving mode or the like) is reset (step S24), and a judgment is made upon whether the blur notification mode is set (step S25).

If it is determined that the blur notification mode is set at this step S25, the camera control section 2 sets a blur detection initialization flag and terminates this subroutine (step S26). The detail of this "blur detection initialization flag" will be described later. On the other hand, if it is determined that the blur notification mode is not set at the step S25, the camera control section 2 terminates this subroutine.

On the other hand, if it is determined that the current state is not in the standby mode at the step S21, the camera control section 2 judges whether the back lid 57 has been changed from the closed state to the opened state based on a status of the back lid SW 24 (step S27).

If it is determined that the back lid 57 has been changed to the opened state at the step S27, the camera control section 2 judges whether a rewind end flag is set (step S27-1). Then, if this flag is not set, a judgment is made upon whether the blur notification mode is set (step S28).

Here, if it is determined that the blur notification mode is set, the blur notification (blur display) is turned off (step S29), and the processing advances to a step S50. On the contrary, if it is determined that the blur notification mode is not set, the processing directly proceeds to the step S50. Further, if the rewind end flag is set at the step S27-1, the rewind end flag is cleared (step S27-2), and then the processing advances to the step S50. The processing at the step S50 and subsequent steps will be described later.

If the back lid 57 has not been changed from the closed state to the opened state at the step S27, a judgment is made upon whether the back lid 57 is open (step S30). If it is determined that the back lid 57 is open, the control proceeds to processing at the step S50 and subsequent steps. On the contrary, if the back lid 57 is closed, the camera control section 2 judges whether the rewind end flag is set (step S30-1). Here, if the rewind end flag is set, it can be assumed that the last frame of a film has been used and the shooting is finished, the forcible rewinding has been performed and the back lid 57 is open in order to take out the film. Therefore, the control advances to the processing at the step S50 and subsequent steps.

On the other hand, if the rewind end flag is not set, the camera control section 2 sequentially executes various subroutines "ZMSW processing", "MODSW processing", "back lid SW processing", "RWSW processing", and "strobe charging processing" which will be described later in detail with reference to FIGS. 9 to 13 (steps S31 to S35).

Briefly mentioning about characteristics common to these subroutines, characteristic processing based on various SW operations is performed, and processing of, e.g., setting the blur detection initialization flag and turning off the blur notification (blur display) is carried out when the blur notification mode is set.

A description will now be given with reference to FIG. 8. After the above-described processing, the camera control section 2 judges whether there is a change in the blur mode SW 12 (step S36). If there is a change, counting of the standby timer is reset (step S37), and a change in state of the blur mode SW 12 is detected (step S38).

If it is detected that the blur mode SW 12 has been changed from the off state to the on state at this step S38, a blur mode mark of the LCD 29 is turned on (step S39), the blur detection initialization flag is set (step S40), and the processing advances to the step S50. On the other hand, if it is detected that the blur mode SW 12 has been changed from the on state to the off state at the step S38, the camera control section 2 turns off the blur notification (blur display) (step S41) and turns off the blur mode mark of the LCD 29 (step S42), and the processing proceeds to the step S50.

On the other hand, if it is determined that there is no change in the blur mode SW 12 at the step S36, a judgment is made upon whether the blur notification mode is in the on state (step S43). Here, if the blur notification mode is in the on state, the camera control section 2 judges whether the blur detection initialization flag is set (step S44).

Here, this "blur detection initialization flag" can be an index when judging whether an output signal from the AF sensor has been already fetched, in other words, judging whether fetching of the output signal from the AF sensor 28 for the blur judgment is the first time or the second time.

If the blur detection initialization flag is set at the step S44, under the control of the camera control section 2, an output signal from the AF sensor 28 is fetched (first time), it is stored in the AF sensor output storage section 72 (step S45), the blur detection initialization flag is cleared (step S46), and then the processing proceeds to the step S50.

Figure 15:
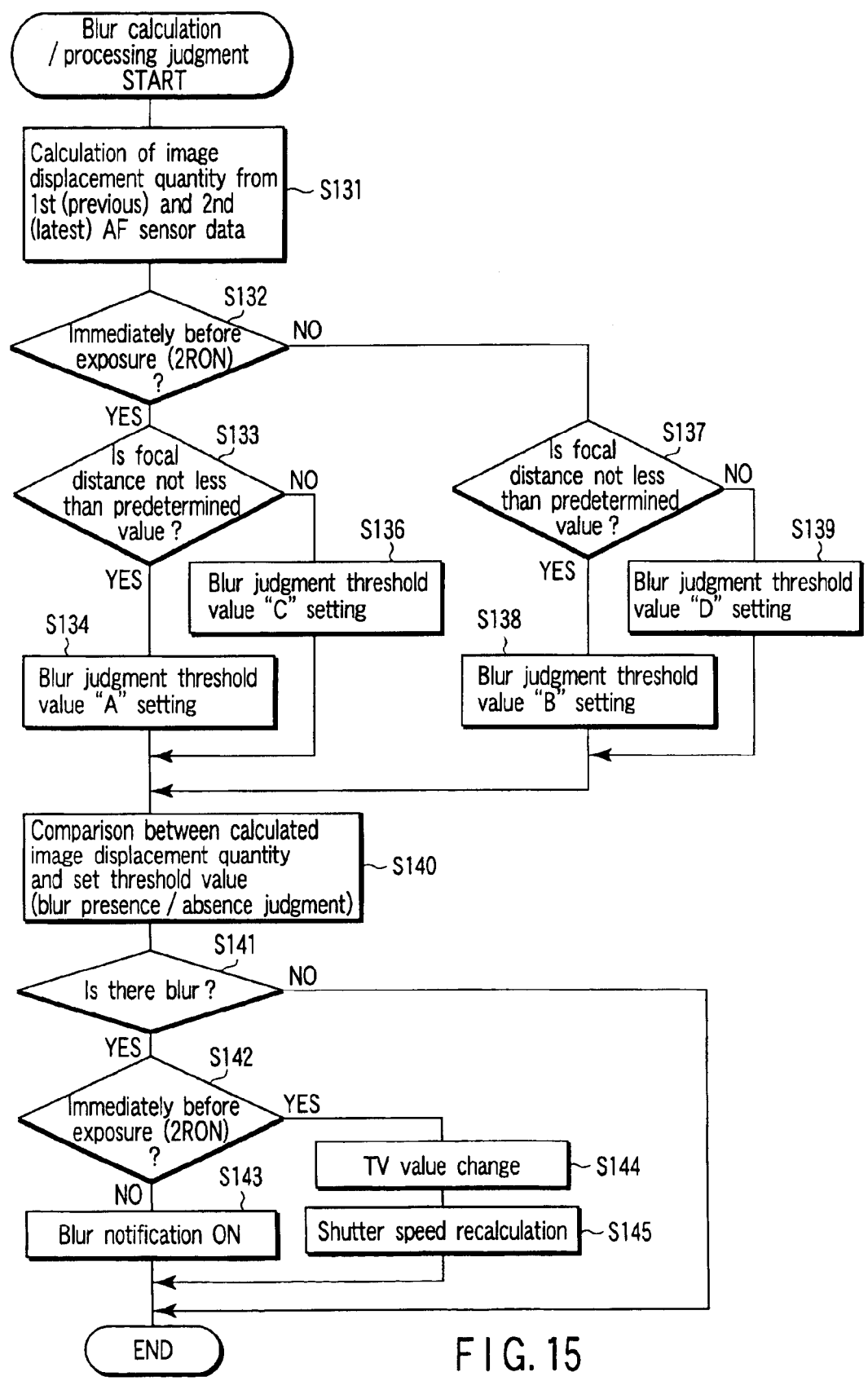
FIG. 15 is a flowchart illustrating a subroutine "blur calculation/judgment processing" in more detail.

On the other hand, if the blur detection initialization flag is not set, under the control of the camera control section 2, the previous (first time) output signal from the AF sensor 28 is stored in the second AF sensor output storage section 73 (step S47), an output signal from the AF sensor 28 is fetched (second time), this signal is stored in the first AF sensor output storage section 72 (step S48), a subroutine "blur calculation/judgment processing" which will be described later in detail with reference to FIG. 15 is executed (step S49), and the processing advances to the step S50.

Briefly mentioning about only characteristics of this subroutine "blur calculation/judgment processing", presence/absence of a blur can be judged by comparing a calculated image displacement quantity with a threshold value in the blur judgment section 6. On the other hand, if the blur notification mode is in the off state at the step S43, the processing proceeds to the step S50.

When the processing shifts to the step S50, the camera control section 2 first detects a clocked time of the standby timer (step 50), and judges whether a standby shift time has passed (step S51). If it is determined that the standby shift time is yet to pass at this step S51, this subroutine is terminated.

On the other hand, if it is determined that the standby shift time has passed, the display of the LCD 29 is turned off (step S52), and a judgment is made upon whether the blur notification mode is set (step S53). If this mode is set, the blur notification (blur display) is turned off (step S54), and this subroutine is terminated. If the blur notification mode is not set, this subroutine is terminated as it is.

Figure 9:
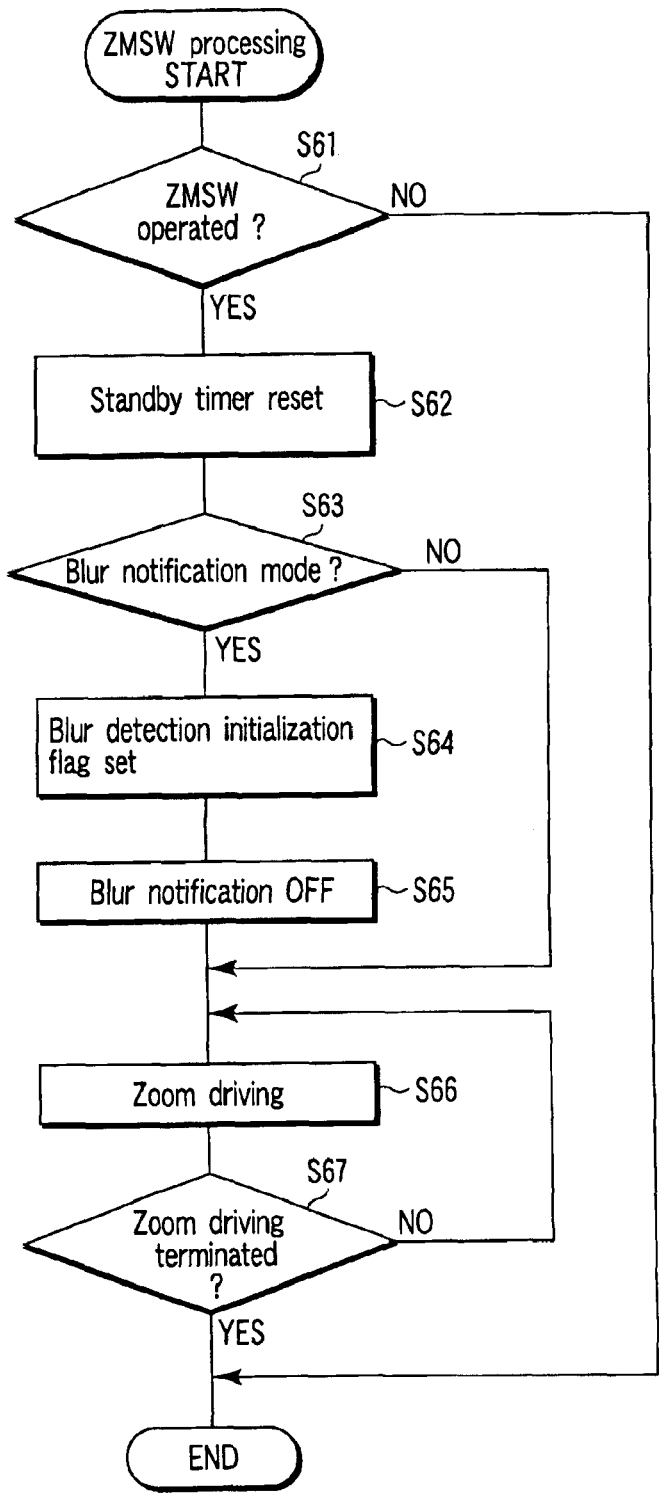
FIG. 9 is a flowchart illustrating a subroutine "ZMSW processing" in more detail.

The subroutine "ZMSW processing" executed at the step S31 in FIG. 7 will now be described in detail with reference to a flowchart of FIG. 9.

When this subroutine is started, the camera control section 2 first judges whether the zoom SW 23 has been operated (step S61). If the zoom SW 23 has not been operated, this subroutine is terminated.

On the other hand, if the zoom SW 23 has been operated, the standby timer is reset (step S62), and a judgment is made upon whether the blur notification mode is set (step S63). Here, if the blur notification mode is not set, the processing directly advances to a step S66. On the other hand, when the blur notification mode is set, the blur detection initialization flag is set (step S64), the blur notification (blur display) is turned off (step S65), and the processing proceeds to the step S66.

When the focusing lens is subjected to zoom driving (a wide-angle side or a telescopic side) (step S66) and the zoom driving is finished (step S67) in this manner, this operation is terminated.

Figure 10:
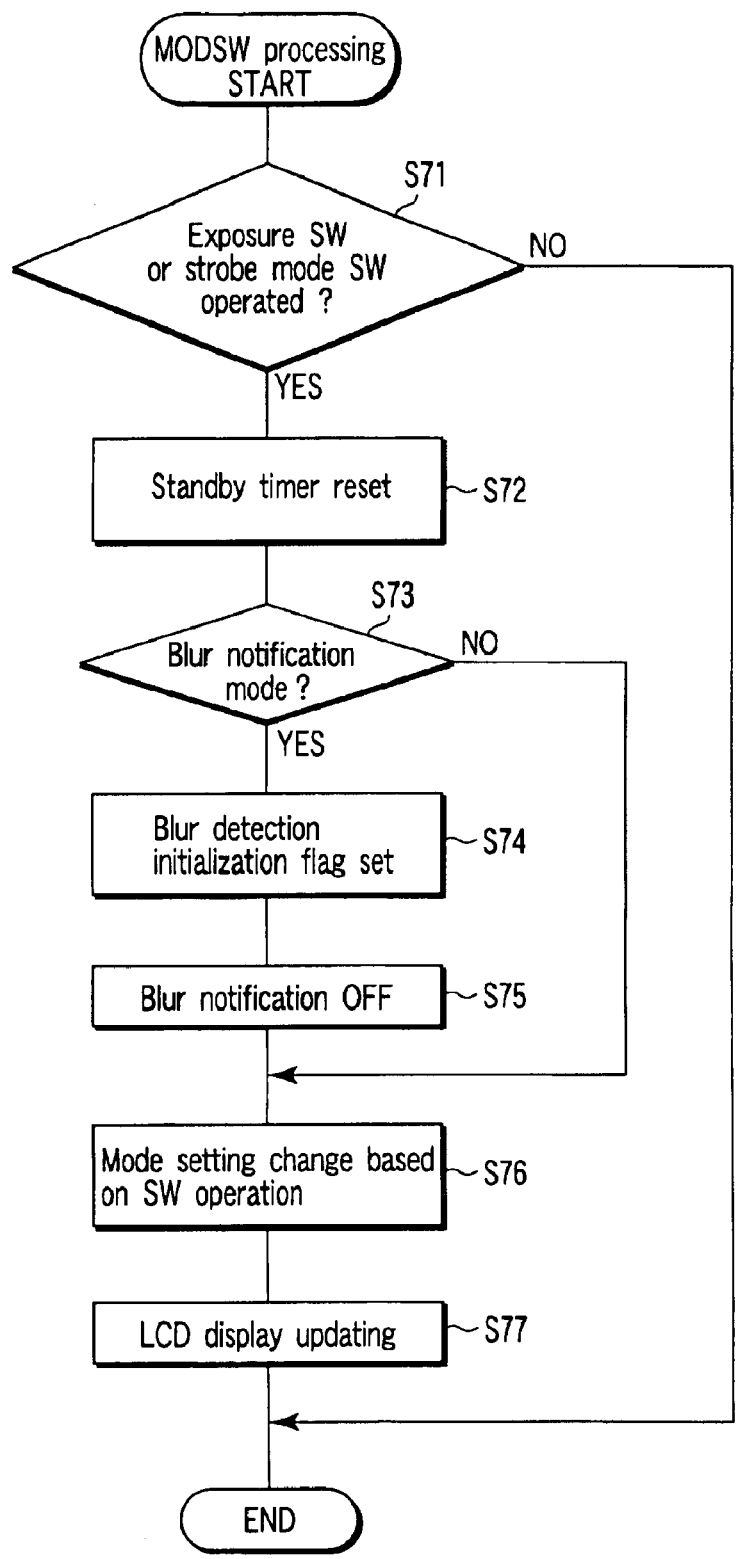
FIG. 10 is a flowchart illustrating a subroutine "MODSW processing" in more detail.

The subroutine "MODSW processing executed at the step S32 in FIG. 7 will now be described in detail with reference to a flowchart of FIG. 10.

When this subroutine is started, the camera control section 2 first judges whether an operation of one of the exposure mode SW 14 and the strobe mode SW 13 has been performed (step S71). Further, if the operation of one of these switches is yet to be performed, this subroutine is terminated. On the other hand, if one of the SW 13 and 14 has been operated, the standby timer is reset (step S72), and a judgment is made upon whether the blur notification mode is set (step S73). Here, if the blur notification mode is not set, the processing directly advances to a step S76.

On the other hand, if the blur notification mode is set, the blur detection initialization flag is set (step S74), the blur notification (blur display) is turned off (step S75), and the processing advances to the step S76. When the mode setting is changed based on the switch operation in this manner (step S76), the display of the LCD 29 is updated (step S77), and this operation is terminated.

Figure 11:
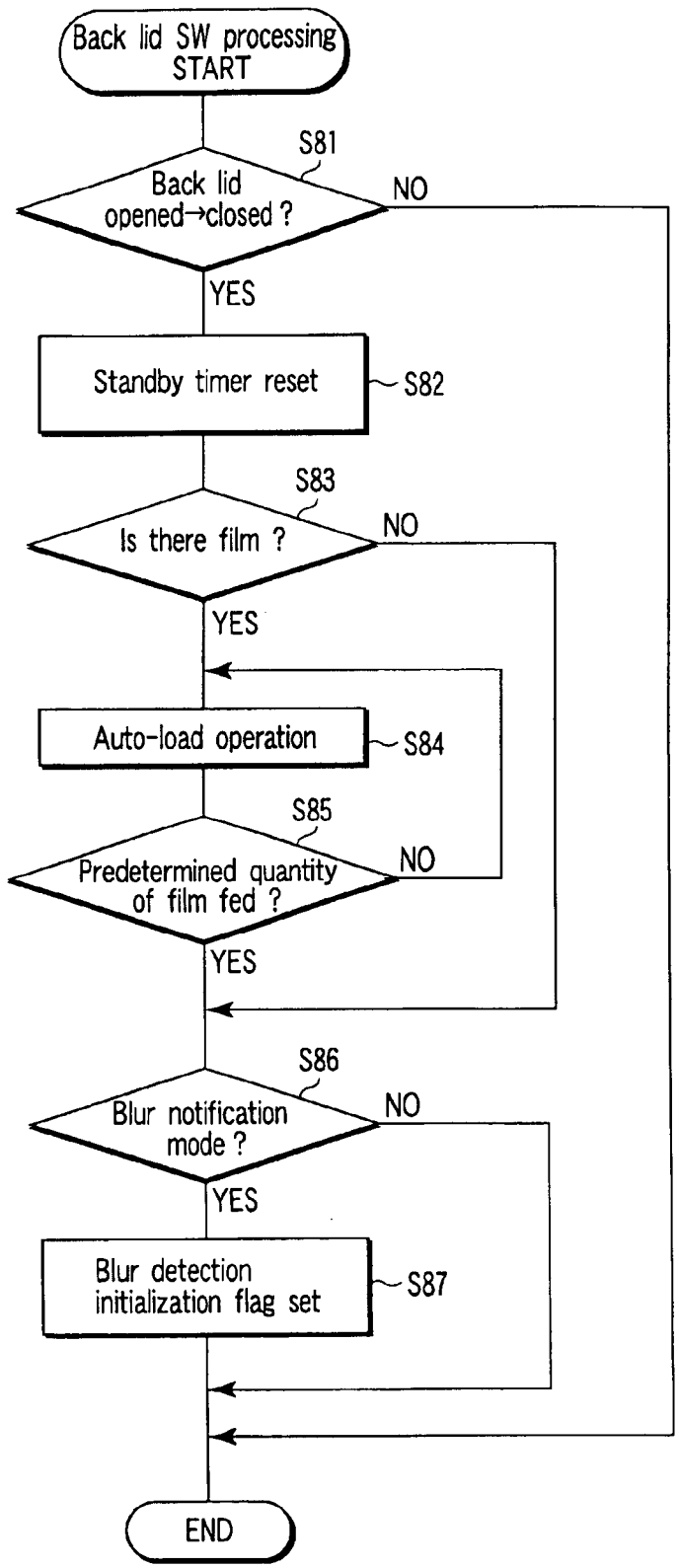
FIG. 11 is a flowchart illustrating a subroutine "back lid SW processing" in more detail.

The subroutine "back lid SW processing" executed at the step S33 in FIG. 7 will now be described in detail with reference to a flowchart of FIG. 11.

When this subroutine is started, the camera control section 2 first judges whether the back lid 57 has been changed from the opened state to the closed state based on a status of the back lid SW 24 (step S81). If the back lid 57 is not closed at this step S81, this subroutine is terminated. On the other hand, if it is determined that the back lid is closed (step S81), the standby timer is reset (step S82), and a judgment is made upon whether there is a film (step S83).

If it is determined that there is no film at this step S83, the processing directly advances to a step S86. On the other hand, if there is a film, an auto-load operation is executed (step S84), this operation is repeated until a predetermined quantity of a film is fed (step S85), and the processing proceeds to the step S86 when the predetermined quantity is fed.

Subsequently, a judgment is made upon whether the blur notification mode is set (step S86). Here, if the blur notification mode is not set, this subroutine is terminated as it is. On the other hand, if the blur notification mode is set, the blur detection initialization flag is set (step S87), and this subroutine is terminated.

Figure 12:
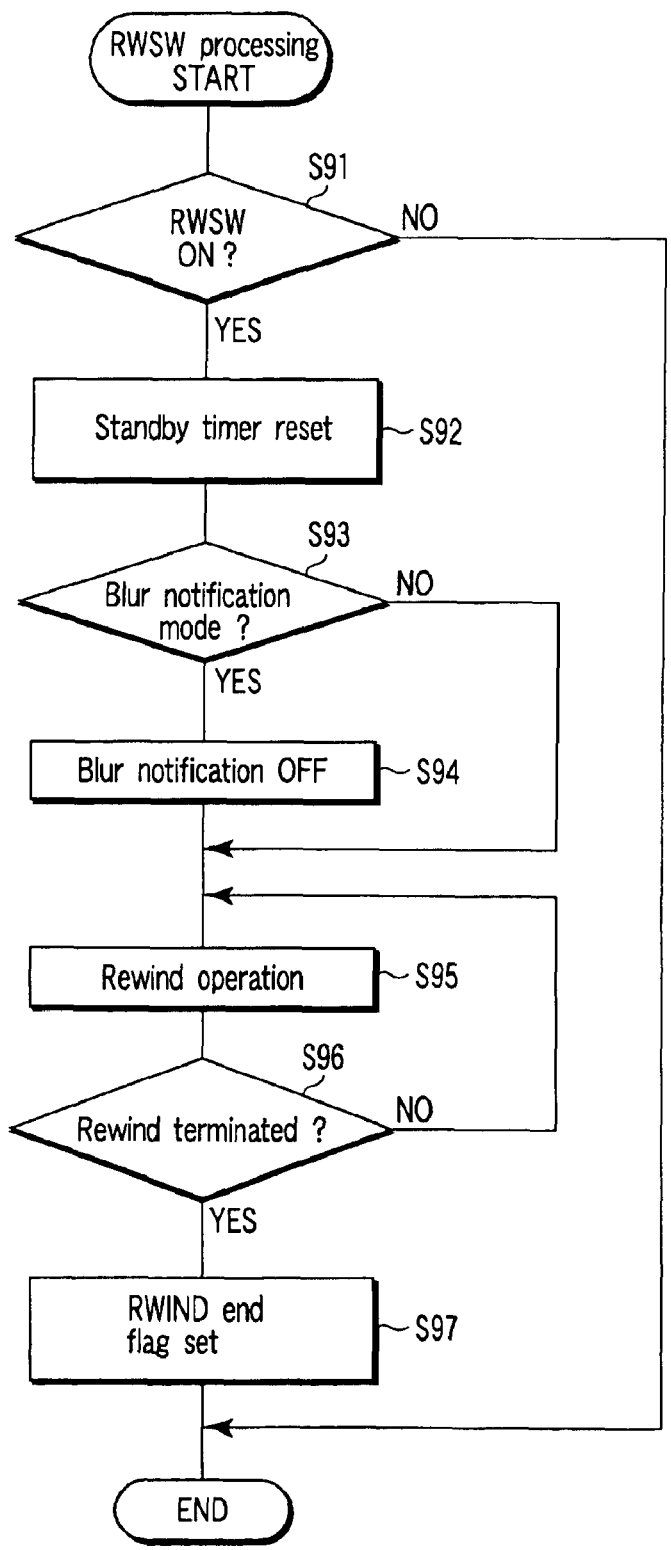
FIG. 12 is a flowchart illustrating a subroutine "RWSW processing" in more detail.

The subroutine "RWSW processing" executed at the step S34 in FIG. 7 will now be described in detail with reference to a flowchart of FIG. 12.

When this subroutine is started, the camera control section 2 first judges whether the rewind SW 25 has been operated (step S91). Further, if the rewind SW 25 has not been operated, this subroutine is terminated.

On the other hand, if the rewind SW 25 has been operated, the standby timer is reset (step S92), and a judgment is made upon whether the blur notification mode is set (step S93). If the blur notification mode is not set, the processing directly advances to a step S95. On the other hand, if the blur notification mode is set, the blur notification (blur display) is turned off (step S94), and the processing proceeds to a step S95.

Subsequently, a rewind operation is effected (step S95). When the rewind operation is finished (step S96), a rewind end flag is set (step S97), and this subroutine is terminated.

Figure 13:
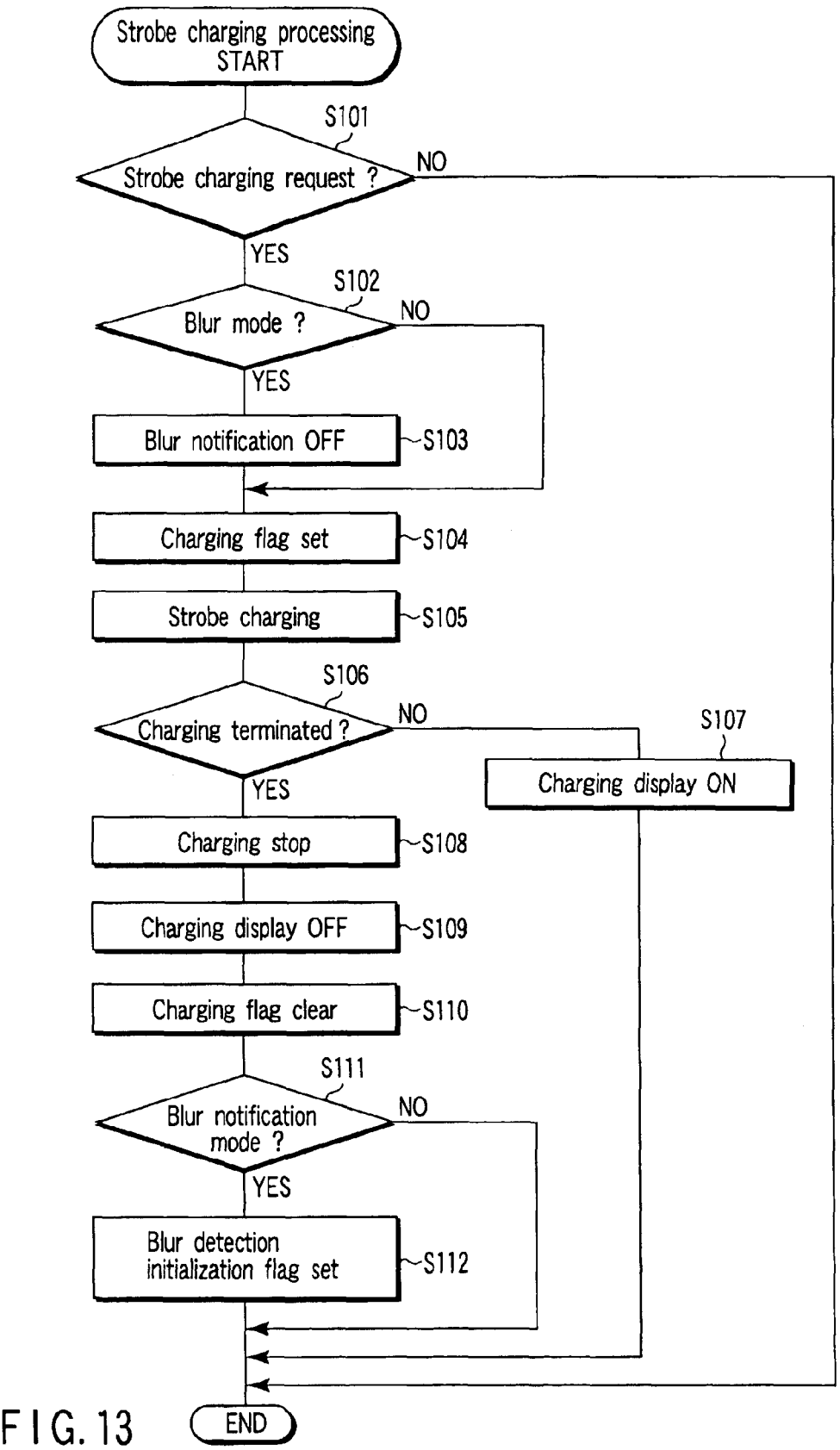
FIG. 13 is a flowchart illustrating a subroutine "strobe charging processing" in more detail.

The subroutine "strobe charging processing" executed at a step S35 in FIG. 7 will now be described with reference to a flowchart of FIG. 13.

When this subroutine is started, the camera control section 2 first judges whether there is a strobe charging request (step S101). Here, if there is no strobe charging request, this subroutine is terminated. On the other hand, if there is a strobe charging request, a judgment is made upon whether the blur notification mode is set (stop S102).

Here, if the blur notification mode is not set, the processing directly advances to a step S104. On the other hand, if the blur notification mode is set, the blur notification (blur display) is turned off (step S103), and then the processing proceeds to the step S104.

Subsequently, a charging flag is set (step S104), and strobe charging is carried out by the strobe charging section 38 (step S105). Furthermore, a judgment is made upon whether charging by the strobe charging section 38 is completed (step S106).

If it is determined that charging is not completed at this step S106, a charging display is turned on (step S107), and this subroutine is terminated.

On the other hand, if it is determined that charging is completed, charging is stopped (step S108), the charging display is turned off (step S109), the charging flag is cleared (step S110), and a judgment is made upon whether the blur notification mode is set (step S111). Moreover, if the blur notification mode is not set, this subroutine is terminated. If the blur notification mode is set, the blur detection initialization flag is set (step S112), and this subroutine is terminated.

Figure 14:
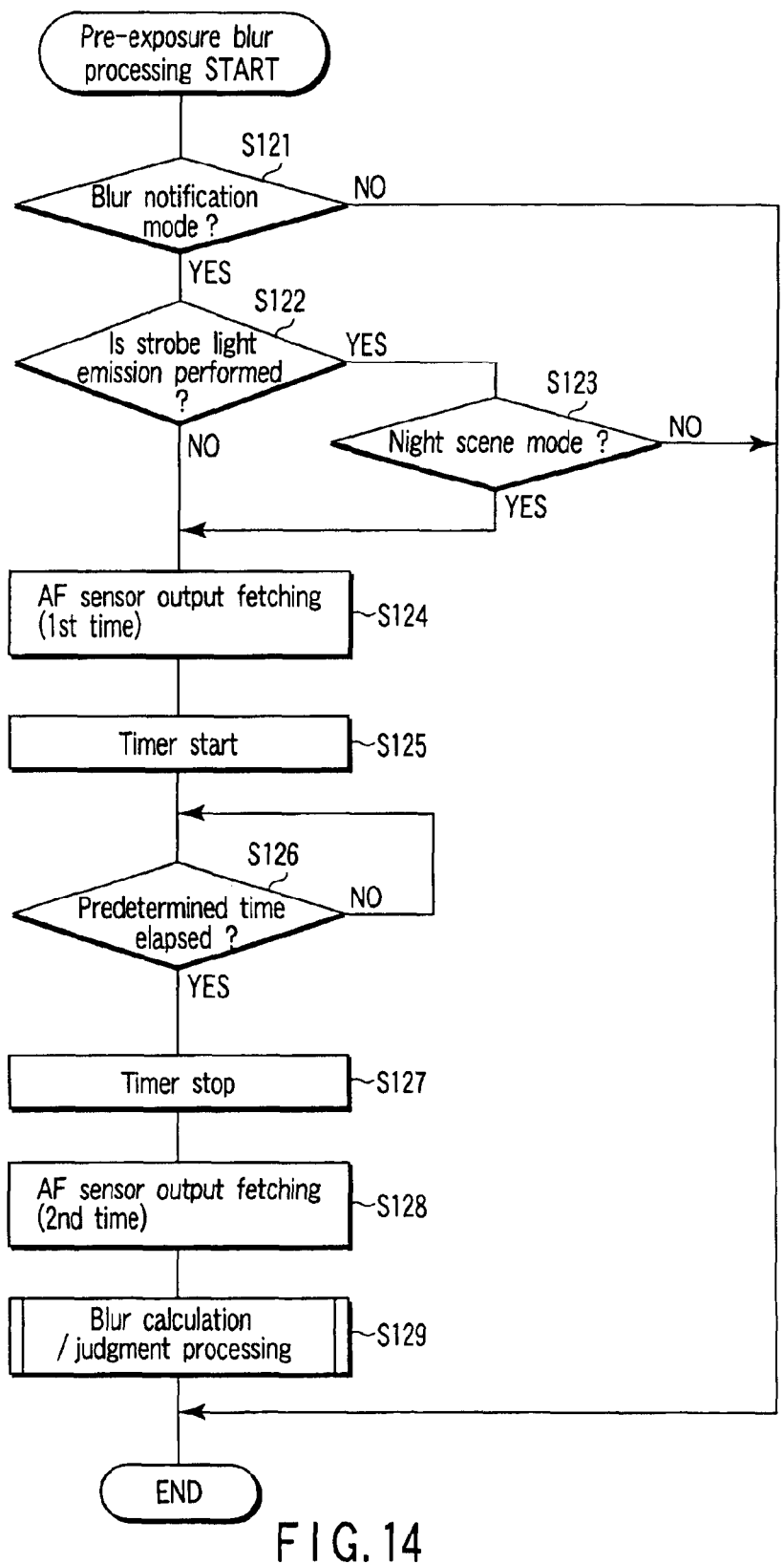
FIG. 14 is a flowchart illustrating a subroutine "pre-exposure blur processing" in more detail.

The subroutine "pre-exposure blur processing" executed at the step S13 in FIG. 6 will now be described in detail with reference to a flowchart of FIG. 14.

When this subroutine is started, the camera control section 2 first judges whether the blur notification mode is set (step S121).

If it is determined that the blur notification mode is not set at this step S121, this subroutine is terminated. On the other hand, if the blur notification mode is set, a judgment is made upon whether strobe light emission is to be carried out (step S122).

Additionally, if the strobe light emission is to be performed, a judgment is made upon whether a night scene mode is set (step S123). If it is determined that the night scene mode is not set at this step S123, this subroutine is terminated. On the other hand, if it is determined that the strobe light emission is not to be performed at the step S122, and if it is determined that the night scene mode is set at the step S123, the processing proceeds to a step S124.

Here, the "night scene mode" is one of the exposure modes, and exposure time generally becomes long in the night scene mode irrespective of presence/absence of the strobe light emission. Therefore, the shutter speed are changed in order to reduce the affect of a blur.

Subsequently, the camera control section 2 fetches (first time) an output from the AF sensor 27 (step S124), starts clocking of a predetermined timer (step S125), waits for a predetermined time to elapse (step S126), stops clocking of the predetermined timer (step S127), fetches (second time) an output from the AF sensor 27 (step S128), executes the subroutine "blur calculation/judgment processing" which will be described later in detail with reference to FIG. 15 (step S129), and terminates this subroutine.

The subroutine "blur calculation/judgment processing" executed at the step S49 in FIG. 8 and the step S129 in FIG. 14 will now be described in detail with reference to a flowchart of FIG. 15.

Here, a description will be given by appropriately making reference to FIG. 16. It is to be noted that a vertical axis in FIG. 16 represents a calculated image displacement quantity and a horizontal axis represents a magnitude of a blur.

When this subroutine is started, an image blur quantity is calculated from first (previous) and second (latest) data of the AF sensor 27 (step S131).

Figure 16:
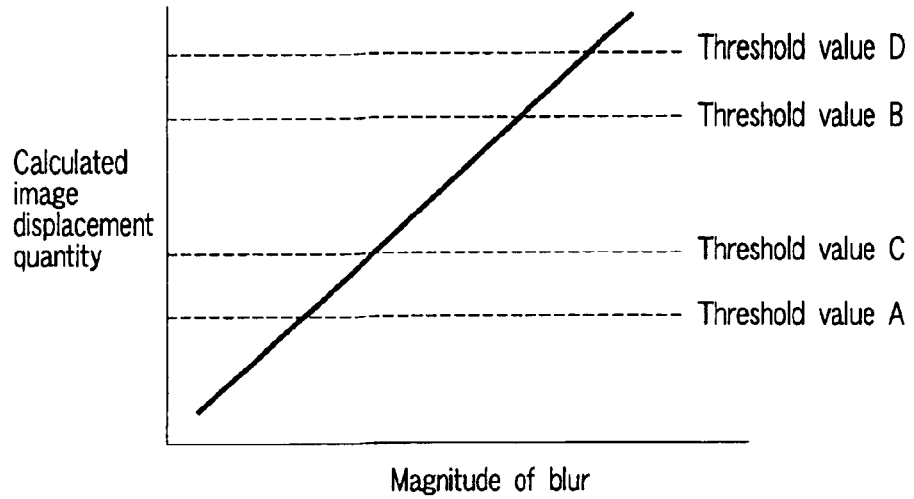
FIG. 16 is a characteristic view showing a largeness relationship between a calculated image displacement quantity and a blur, and threshold values A to D.

Then, the camera control section 2 sets a blur judgment threshold value to one of A to D shown in FIG. 16 based on judgments on whether the current state is immediately before exposure and whether a focal distance is not less than a predetermined value (steps S132 to S139).

When the blur judgment threshold value is set to a low value (rigid value) if the current state is not immediately before exposure, the blur notification (blur display) is frequently carried out, which may burden a user. In view of this fact, the blur judgment threshold value is set to a high value (modest value) if the current state is not immediately before exposure. Moreover, in view of the fact that a blur generally largely affects in the telescopic mode rather than the wide-angle mode, the blur judgment threshold value is set to a low value (rigid value) when a focal distance is not less than the predetermined value as compared with a case that it is less than the predetermined value.

In detail, a judgment is first made upon whether the current state is immediately before exposure (whether the 2RSW 22 has been turned on) (step S132). If it is immediately before exposure, a judgment is made upon whether a focal distance is not less than the predetermined value (step S133). Additionally, if it is determined that the focal distance is not less than the predetermined value, the blur judgment threshold value is set to A in FIG. 16 (step S134). If it is determined that it is less than the predetermined value, the blur judgment threshold value is set to C in FIG. 16 (step S136), and the processing advances to a step S140.

On the other hand, if it is determined that the current state is not immediately before exposure, a judgment is made upon whether the focal distance is not less than the predetermined value (step S137). If it is determined that the focal distance is not less than the predetermined value, the blur judgment threshold value is set to B in FIG. 16 (step S138). If it is determined that it is less than the predetermined value, the blur judgment threshold value is set to D in FIG. 16 (step S139), and the processing proceeds to the step S140.

Subsequently, the blur judgment section 6 judges presence/absence of occurrence of a blur by comparing the calculated image displacement quantity with the set threshold value set in the above-described operation (steps S140 and S141). Here, if it is determined that there is no blur, this subroutine is terminated.

On the other hand, if it is determined that there is a blur, the camera control section 2 judges whether the current state is immediately before exposure (whether the 2RSW 22 has been turned on). Further, if it is determined that the current state is immediately before exposure, a TV value concerning an apex calculation is changed (step S144), the shutter speed is recalculated (step S145), and this subroutine is terminated. On the other hand, if it is determined that the current state is not immediately before exposure, the blur notification (blur display) is turned on (step S143), and this subroutine is terminated.

As described above, in the first embodiment according to the present invention, the blur state notification timing is switched when the blur notification mode is set and when the camera and the 1RSW 21 are operated. As a result, it is possible to realize a camera having a blur notifying function which can perform a blur notification (which can draw a camera user's attention) with a timing which is comprehensible to the camera user.

Furthermore, even if a user fully pushed the release button in order to hasten taking a picture, an appropriate blur state notification is carried out, a rule of thumb of a blur state when taking a picture can be suggested to a camera user, and a warning about holding the camera can be given.

Although the above has described the first embodiment according to the present invention, the notification operation concerning a blur can be performed immediately after the power on reset, i.e., immediately after the initialization operation of the camera is completed, for example.

It is to be noted that the present invention includes the following contents.

That is, there is provided a camera having a blur notifying function comprising: a blur mode setting section to set a blur notification mode in which a blur is detected in the camera and a blur state notification is carried out; a blur detection section used to detect a blur state of the camera; a blur calculation section which calculates a generated blur state quantity based on an output from the blur detection section; a blur judgment section which judges a blur state based on the generated blur state quantity; and a blur notification section which performs a notification operation concerning occurrence of the blur state based on a judgment result of the blur judgment section, wherein the blur notification section starts the notification operation when the blur notification mode is set by the blur mode setting section, the blur notification section is constituted of a focusing sound production device, and a notification content is caused to differ by changing an output sound of the sound production device before and after an operation of the first release switch. In more detail, before the 1RSW is turned on, a sound volume of the sound production device (e.g., a buzzer) is increased or a sound production cycle is shortened if a blur is large. On the other hand, when the IRSW is turned on, it can be considered that the blur notification is stopped, and a pip sound is produced at the time of focusing based on AF.

As described above in detail, according to the first embodiment of the present invention, it is possible to provide the camera having a blur notifying function which notifies a blur with a timing which is comprehensible to a camera operator without increasing a cost of the camera.

(Second Embodiment)

Figure 17:
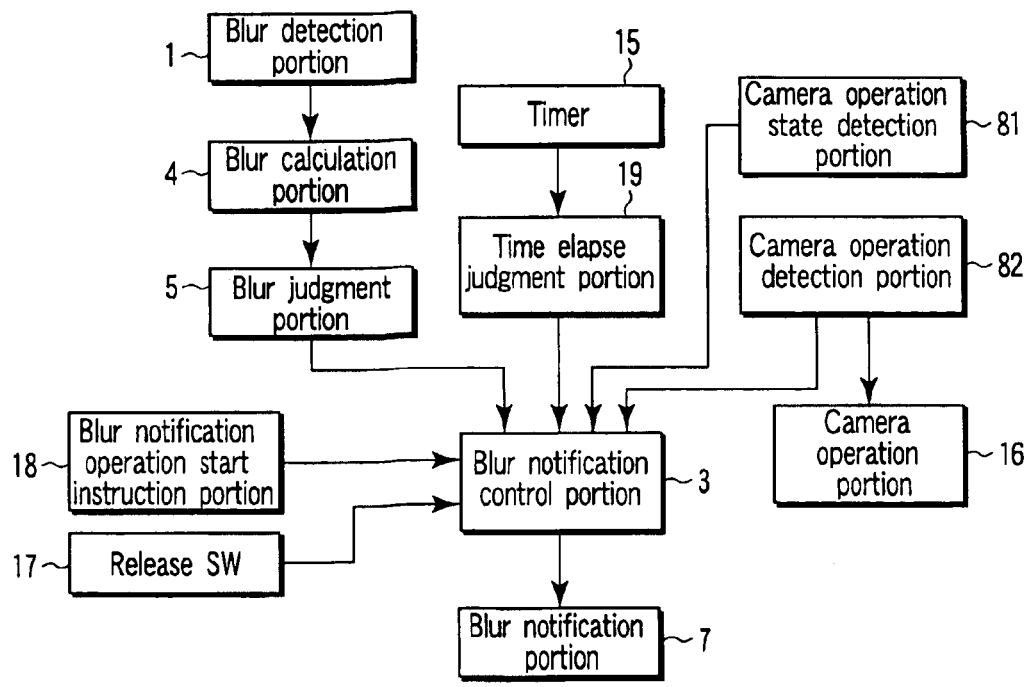
FIG. 17 is a view showing a structure of a camera having a blur notifying function according to a second embodiment of the present invention.

FIG. 17 shows a structure of a camera having a blur notifying function according to a second embodiment of the present invention, and this structure will now be described.

As shown in FIG. 17, an output of a blur notification operation start instruction section (corresponding to the mode setting section) 18 and an output of a release SW (including a first release SW) 17 are electrically connected with inputs of a blur notification control section 3. Further, an output of a blur detection section 1 is electrically connected with an input of a blur calculation section 4.

An output of the blur calculation section 4 is electrically connected with an input of a blur judgment section 5. An output of the blur judgment section 5 is electrically connected with an input of the blur notification control section 3. Furthermore, outputs of a camera operation detection section 82 are electrically connected with an input of a camera operation section 16 and an input of the blur notification control section 3. An output of a timer is electrically connected with an input of the blur notification control section 3 through a time elapse judgment section 19. An output of a camera operation state detection section 81 is electrically connected with an input of the blur notification control section 3. Moreover, an output of the blur notification control section 3 is electrically connected with an input of a blur notification section 7.

In such a structure, the blur notification operation start instruction section 18 instructs start of at least one of detection of a blur state and notification of a blur state. The blur notification section 7 performs at least one of detection of a blur state and notification of the same in response to an instruction from the blur notification operation start instruction section 18 under the control of the blur notification control section 3.

The release SW (which means the first release switch in this example) 17 instructs to shift to a shooting preparation operation of the camera and also instructs to stop at least one of detection of the blur state and notification of the same. The camera operation state detection section 81 detects an operation state of the camera.

The timer 15 is updated every time the camera is operated, and clocks a time after the latest camera operation is performed. The time elapse judgment section 19 judges whether a clocked time by the timer is equal to or beyond a fixed time.

Additionally, in execution of the blur notification operation in the blur notification section 7, when the camera operation detection section 82 detects an operation of an operation switch, when the camera operation state detection section 81 detects a predetermined camera operation state or when the time elapse judgment section 19 determines that an elapsed time is equal to or beyond a fixed time, the blur notification control section 3 controls so as to stop at least one of detection of the blur state or notification of the same in the blur notification section 7.

Although not shown here, the operation switch is at least one of a zoom switch, an exposure mode switch, a strobe mode switch, a date mode switch and a film rewind switch. The camera operation state detection section 81 is characterized in detecting at least one of a strobe charging state, a zoom lens drive state, a film auto-load state and a film rewind state of the camera. Further, the when an operation by the operation switch and a predetermined camera operation detected by the camera operation state detection section 81 are terminated, the blur notification section 7 restarts the blur notification operation.

As described above, in the camera having a blur notifying function according to the second embodiment, the camera which performs the blur detection and the blur notification in a period after the blur notification mode is set and before the first release switch is turned on stops detection of a blur and notification of a blur during the strobe charging, the power saving mode, the zoom driving, the exposure/strobe/date mode setting, the back lid opened state, the auto-load operation and the rewind operation after termination of shooting, and restarts detection and notification of a blur when these operations are completed.

As mentioned above, according to the second embodiment of the present invention, it is possible to provide the camera having a blur notifying function which can improve the usability, appropriately display a blur state and support achievement of a shooting operation by controlling detection/notification display of a blur state in accordance with an operation sequence of the camera without introducing confusion to a camera user.

(Third Embodiment)

Figure 18:
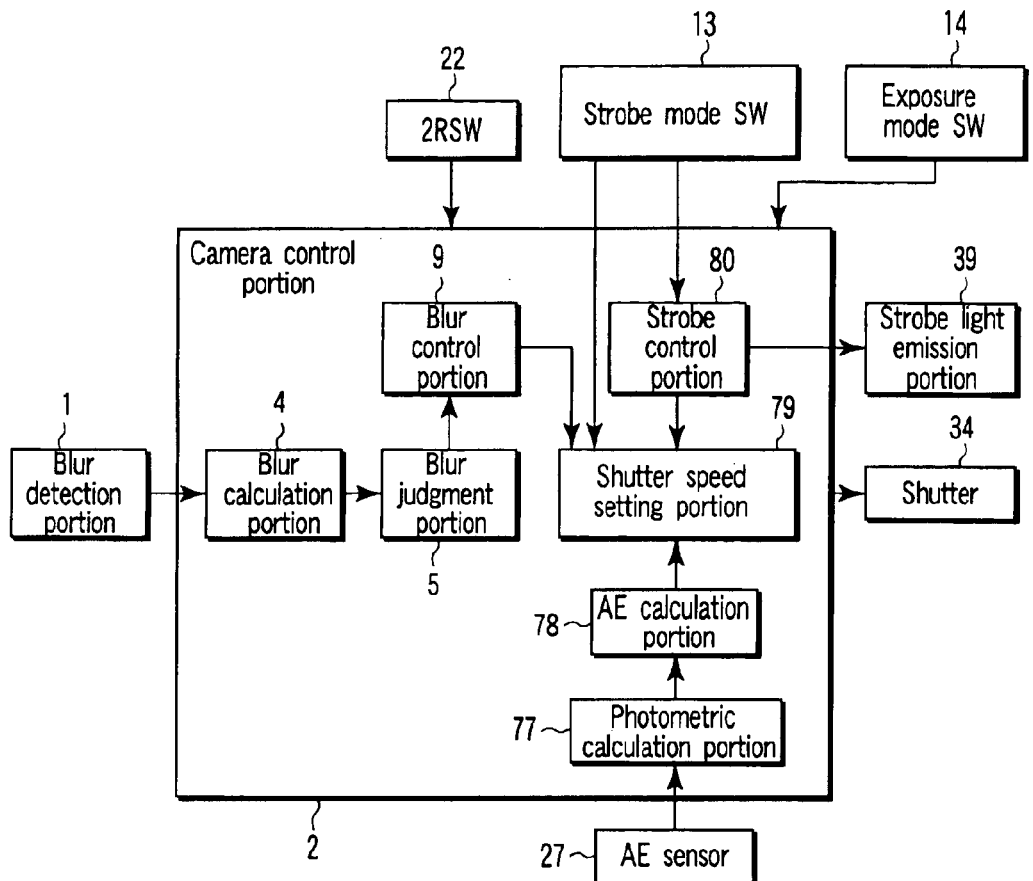
FIG. 18 is a view showing a structure of a camera according to the third embodiment of the present invention.

FIG. 18 illustrates a structure of a camera according to a third embodiment of the present invention. As shown in FIG. 18, in a camera control section 2 which is in charge of the entire control are arranged a blur calculation section 4, a blur judgment section 5, a blur control section 9, a strobe control section 80, a shutter speed setting section 79, a photometric calculation section 77 and an AE calculation section 78.

An output of a blur detection section 1 is electrically connected with an input of the blur calculation section 4, and an output of the blur calculation section 4 is electrically connected with an input of the blur judgment section 5. An output of the blur judgment section 5 is electrically connected with an input of the blur control section 9, and an output of the blur control section 9 is electrically connected with an input of the shutter speed setting section 79.

Outputs of a strobe mode SW 13 are electrically connected with respective inputs of the strobe control section 80 and the shutter speed setting section 79.

An output of this strobe control section 80 is electrically connected with an input of the shutter speed setting section 79. An output of the AE sensor 27 is electrically connected with an input of the AE calculation section 78 through the photometric calculation section 77. An output of the AE calculation section 78 is electrically connected with an input of the shutter speed setting section 79. A strobe light emission section 39 is electrically connected with the strobe control section 80. To the camera control section 2 are electrically or mechanically connected a second release switch (which will be referred to as a 2RSW 22 hereinafter), an exposure mode SW 14 and a shutter 34.

In such a structure, after the 2RSW 22 is operated (on), when the blur detection section 1 detects a blur state generated in the camera, a signal concerning a result of the detection is outputted to the blur calculation section 4. This blur calculation section 4 calculates a blur quantity generated in the camera based on this signal. A signal concerning this blur quantity is outputted to the blur judgment section 5. The blur judgment section 5 compares the blur quantity with a predetermined value and judges whether a blur state is generated, and a signal concerning a judgment result is outputted to the blur control section 9.

On the other hand, when the strobe light emission mode is set by the strobe mode SW 13, a signal concerning this mode setting is outputted to the strobe control section 80 and the shutter speed setting section 79. Here, the "strobe light emission mode" set by the strobe mode SW 13 includes, e.g., a fill-in mode (forcible light emission mode), an AUTO mode (light may or may not be emitted depending on brightness), turning off the strobe light emission and others.

An output of the AE sensor 27 is outputted to the shutter speed setting section 79 through the photometric calculation section 77 and the AE calculation section 78. The shutter speed determination section 79 determines strobe light emission necessity information and shutter speed. This "strobe light emission necessity information" is information indicative of whether strobe light emission is required (light emission is enabled/disabled).

In more detail, the shutter speed determination section 79 changes the determined shutter speed based on at least the signal concerning the judgment result by the blur judgment section 9 and the signal concerning presence/absence of setting of the strobe light emission mode set by the strobe mode SW 13. Further, the presence/absence of the strobe light emission in shooting is determined in the strobe control section 80 based on the strobe light emission mode set by the strobe mode SW 13 and the strobe light emission necessity information determined by the shutter speed determination section 79.

It is to be noted that the determined shutter speed may be changed in the shutter speed determination section 79 only when the blur judgment section 5 has determined that a predetermined quantity or above of blur is generated and the strobe control section 80 has determined to disable the strobe light emission in shooting.

Furthermore, in cases where a predetermined exposure mode has been set in the exposure mode SW 14, when the blur judgment section 5 has judged that a predetermined quantity or above of blur is generated in a picture, the shutter speed determination section 79 may change the determined shutter speed irrespective of presence/absence of the strobe light emission in shooting by the strobe control section 80.

As described above, in the camera according to the third embodiment of the present invention, whether an exposure time is reduced is determined in accordance with presence/absence of the strobe light emission during exposure and a blur state immediately before exposure. As a result, according to the camera of the third embodiment, adequate shooting can be realized and occurrence of blurs in pictures can be suppressed as much as possible.

Furthermore, high-grade shooting can be performed by simultaneously effecting the strobe light emission shooting and a reduction in exposure time in accordance with the exposure mode of the camera.

As described above, according to the third embodiment of the present invention, it is possible to provide the camera which can realize appropriate shooting by determining presence/absence of the strobe light emission in exposure and whether an exposure time is reduced in accordance with a blur state immediately before exposure.

(Fourth Embodiment)

Figure 19:
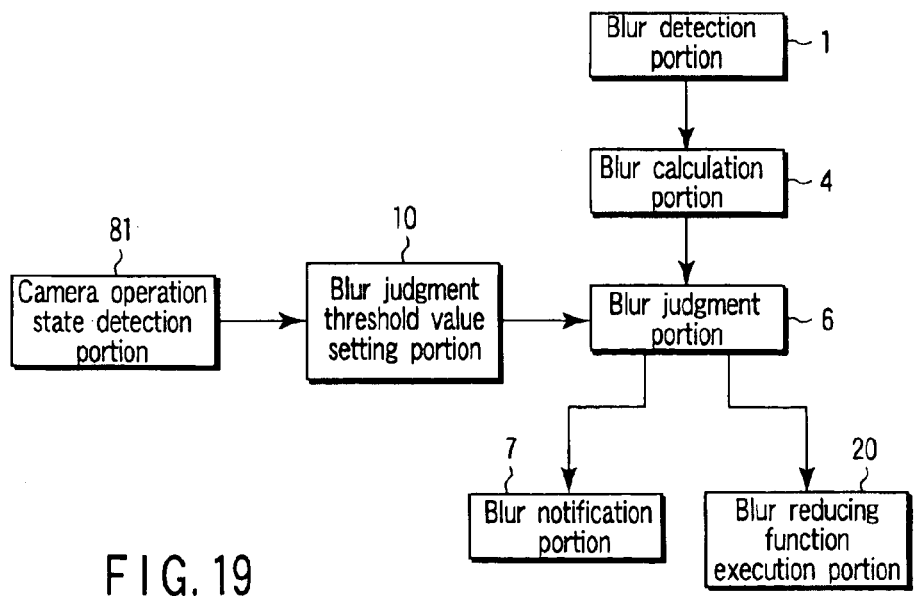
FIG. 19 is a view showing a camera having a blur notifying function according to a fourth embodiment of the present invention.

FIG. 19 illustrates a structure of a camera having a blur notifying function according to a fourth embodiment of the present invention.

In FIG. 19, an output of a camera operation state detection section 81 is electrically connected with an input of a blur judgment threshold value setting section 10, and an output of the blur judgment threshold value setting section 10 is electrically connected with an input of a blur judgment section 6. An output of a blur detection section 1 is electrically connected with an input of a blur calculation section 4. An output of this blur calculation section 4 is electrically connected with an input of the blur judgment section 6. Outputs of this blur judgment section 6 are electrically connected with respective inputs of a blur notification section 7 and a blur reducing function execution section 20.

In such a structure, when the blur detection section 1 detects a blur state of the camera, a signal concerning this detection is outputted to the blur calculation section 4. The blur calculation section 4 calculates a generated blur state quantity of the camera based on this signal, and outputs a result to the blur judgment section 6.

The camera operation state judgment section 81 judges an operation state of the camera based on, e.g., whether the current state is immediately before exposure, whether the current state is before or after a first release switch is turned on, detection of a focal distance state and others, and outputs a signal concerning a result of this judgment to the blur judgment threshold value setting section 10.

Moreover, the blur judgment threshold value setting section 10 changes a set threshold value in accordance with the judgment result of the camera operation state judgment section 81. The blur judgment section 6 compares a calculation result of the blur calculation section 4 with a threshold value set by the blur judgment threshold value setting section 10, and judges a blur state. Additionally, a signal concerning a result of the judgment on the blur state is outputted to the blur notification section 7 and the blur reducing function execution section 20, and the blur notification section 7 notifies a generated blur state based on the judgment result. The blur reducing function execution section 20 executes a blur reducing function in order to reduce a blur in a picture based on the judgment result.

It is to be noted that the camera operation state detection section 81 judges whether the current state is before starting exposure at least after a second release switch is turned on.

When it is judged that the current state is such a state, the camera operation state detection section 81 can set a threshold value set in the blur judgment threshold setting section 10 to a value lower than a threshold value when the current state is not such a state. Further, the blur reducing function execution section 20 can reduce photometrically calculated shutter speed determined when the first release switch was turned on. Furthermore, it is needless to say that a threshold value to be changed may be caused to differ in accordance with a focal distance. This will be described later.

As described above, in the camera according to the fourth embodiment, a threshold value which is compared with a blur detection result in order to notify a blur state before shooting is set higher (modest) than a threshold value used to judge a blur state immediately before shooting. As a result, a blur notification operation with the excellent usability can be performed before shooting, and an accurate blur state judgment can be carried out immediately before shooting, thereby executing an effective blur reducing measure.

As described above, according to the fourth embodiment of the present invention, it is possible to provide a camera having a blur detecting/notifying function which can adequately detect/notify a blur state in accordance with an operation sequence of the camera by causing a threshold value compared with a blur detection result in order to notify a blur state before shooting to differ from a threshold value used to judge a blur state immediately before shooting and setting the former value to be relatively higher (modest), improve the usability, and reduce blurred pictures.

Although the above has described the first to fourth embodiments according to the present invention, the present invention, needless to say, includes a combination of the plurality of these embodiments, a method specified as an effect of the camera according to these embodiments, and inventions as a program concerning control of the camera and as a storage medium storing the program therein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A camera having a blur notifying function comprising:

a blur mode setting section to set a blur notification mode in which a blur is detected in the camera and a blur state is notified;

a blur detection section which detects a blur state of the camera;

a blur calculation section which calculates a generated blur state quantity based on an output from the blur detection section;

a blur judgment section which judges a blur state based on the generated blur state quantity;

a blur notification section which performs a notification operation concerning occurrence of a blur state based on a judgment result of the blur judgment section; and a first release switch used to instruct a shooting preparation operation of the camera, wherein the notification operation concerning occurrence of the blur state in the blur notification section is stopped when the first release switch is operated, wherein the blur notification section starts a notification operation when the blur notification mode is set by the blur mode setting section.

2. The camera having a blur notifying function according to claim 1, wherein the blur notification section is constituted of an LED provided in the vicinity of a finder of the camera, and a notification content is caused to differ by changing a conformation of lighting of the LED before and after the operation of the first release switch.

3. A camera having a blur notifying function comprising:
a blur mode setting section to set a blur notification mode in which a blur is detected in the camera and a blur state is notified;
a blur detection section which detects a blur state of the camera;
a blur calculation section which calculates a generated blur state quantity based on an output from the blur detection section;
a blur judgment section which judges a blur state based on the generated blur state quantity; and
a blur notification section which performs a notification operation concerning occurrence of a blur state based on a judgment result of the blur judgment section,
wherein the blur notification section starts a notification operation when the blur notification mode is set by the blur mode setting section, and
wherein the blur notification section is constituted of an LED provided in the vicinity of a finder of the camera, and a notification content is caused to differ by changing a conformation of lighting of the LED before and after the operation of the first release switch.

4. A camera having a blur notifying function comprising:
a blur notification operation start instruction section which instructs to start detection of a blur state and notification of the blur state;
a blur notification section which performs operations of detection and notification of the blur state in accordance with an instruction from the blur notification operation start instruction section;
a first release switch which instructs to shift to a shooting preparation operation of the camera and also instructs to stop the operations of detection and notification of the blur state;
an operation switch used to cause the camera to perform a predetermined operation;
a camera operation state detection section which detects an operation state of the camera;
a timer which is updated every time the camera is operated and clocks a time after the latest camera operation is performed;
a time elapse judgment section which judges whether a clocked time of the timer is equal to or beyond a fixed time; and
a blur notification control section which controls to stop at least one of detection and notification of the blur state in the blur notification section when the operation of the operation switch is performed and the predetermined camera operation is started, when the predetermined camera operation state is detected by the camera operation state detection section, or when the time elapse judgment section judges that an elapsed time of the timer is equal to or beyond the fixed time during execution of the blur notification operation in the blur notification operation.

5. The camera having a blur notifying function according to claim 4, wherein the operation switch is at least one of a zoom switch, an exposure mode switch, a strobe mode switch, a date mode switch and a film rewind switch, and the camera operation state detection section detects at least one of a strobe charging state, a zoom lens driving state, a film auto-load state and a film rewind state in the camera.

6. The camera having a blur notifying function according to claim 5, wherein the blur notification operation in the blur notification section is restarted when the operation by the operation switch and the predetermined camera operation detected by the camera operation state detection section are terminated.

7. The camera having a blur notifying function according to claim 4, wherein the blur notification operation in the blur notification section is restarted when the operation by the operation switch and the predetermined camera operation detected by the camera operation state detection section are terminated.

8. A camera comprising:
a blur detection section which detects a blur state generated in the camera;
a blur calculation section which calculates a blur quantity generated in the camera based on an output from the blur detection section;
a blur judgment section which judges a blur state by comparing a calculation result of the blur calculation section with a predetermined value;
a strobe mode setting section which sets a strobe light emission mode of the camera;
a shutter speed determination section which determines strobe light emission necessity information and shutter speed based on at least an output from a photometric sensor of the camera;
a strobe light emission control section which determines presence/absence of strobe light emission in shooting based on the strobe light emission mode set by the strobe mode setting section and the strobe light emission necessity information determined by the shutter speed determination section; and
a second release switch which instructs a shooting start operation of the camera,
wherein the blur detection section starts the blur detection operation after the second release switch is operated, and the shutter speed determination section changes the determined shutter speed based on a judgment result of the blur judgment section, the strobe light emission mode set by the strobe mode setting section and the strobe light emission necessity presence/absence information.

9. The camera according to claim 8, wherein the shutter speed determination section changes the determined shutter speed only when the blur judgment section judges that a predetermined quantity or above of blur is generated and the strobe light emission control section determines not to perform strobe light emission in shooting.

10. The camera according to claim 9, further comprising an exposure mode setting section which sets a shooting exposure mode,
wherein, in cases where a predetermined exposure mode is set by the exposure mode setting section, when the blur judgment section judges that a predetermined quantity or above of blur is generated in a picture, the shutter speed determination section changes the determined shutter speed irrespective of presence/absence of strobe light emission in shooting by the strobe light emission control section.

11. The camera according to claim 10, wherein the predetermined exposure mode is a night scene mode.

12. A camera having a blur notifying function comprising:
a blur detection section which detects a blur state of the camera;

a blur calculation section which calculates a generated blur state quantity based on an output from the blur detection section;

a camera operation state judgment section which judges an operation state of the camera;

a blur judgment threshold value setting section which changes a set threshold value in accordance with a judgment result of the camera operation state judgment section;

a blur judgment section which compares a calculation result of the blur calculation section with a threshold value set in the blur judgment threshold value setting section and judges a blur state;

a blur notification section which notifies a generated blur state based on a judgment result of the blur judgment section; and a blur reducing function execution section which executes a blur reducing function in order to reduce a blur in a picture based on the judgment result of the blur judgment section, wherein the camera operation state detection section judges whether a current state is before start of exposure after at least a second release switch of the camera is turned on, and when it is determined that the current state is such a state, a threshold value set in the blur judgment threshold value setting section is set to a value lower than a threshold value when the current state is not such a state.

13. A camera having a blur notifying function comprising:

a blur detection section which detects a blur state of the camera;

a blur calculation section which calculates a generated blur state quantity based on an output from the blur detection section;

a camera operation state judgment section which judges an operation state of the camera;

a blur judgment threshold value setting section which changes a set threshold value in accordance with a judgment result of the camera operation state judgment section;

a blur judgment section which compares a calculation result of the blur calculation section with a threshold value set in the blur judgment threshold value setting section and judges a blur state;

a blur notification section which notifies a generated blur state based on a judgment result of the blur judgment section; and a blur reducing function execution section which executes a blur reducing function in order to reduce a blur in a picture based on the judgment result of the blur judgment section, wherein the blur reducing function execution section reduces photometrically calculated shutter speed set when a first release switch is turned on.

* * * * *